US008452701B2

(12) United States Patent
Kavounas

(10) Patent No.: US 8,452,701 B2
(45) Date of Patent: *May 28, 2013

(54) METHODS, DEVICES AND BANK COMPUTERS FOR CONSUMERS USING COMMUNICATORS TO WIRE FUNDS TO SELLERS AND VENDING MACHINES

(75) Inventor: Gregory T. Kavounas, Kirkland, WA (US)

(73) Assignee: Wireless Commerce LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/753,728

(22) Filed: Apr. 2, 2010

(65) Prior Publication Data

US 2010/0198729 A1    Aug. 5, 2010

Related U.S. Application Data

(63) Continuation of application No. 10/182,177, filed as application No. PCT/US01/00144 on Jan. 2, 2001, now Pat. No. 7,720,756, and a continuation of application No. 09/525,575, filed on Mar. 15, 2000, now abandoned.

(60) Provisional application No. 60/228,951, filed on Aug. 28, 2000, provisional application No. 60/178,262, filed on Jan. 25, 2000.

(51) Int. Cl.
*G06Q 40/00* (2012.01)

(52) U.S. Cl.
USPC .................. 705/39; 705/37; 705/38; 705/40; 705/42

(58) Field of Classification Search
USPC ..................................... 705/15–45
See application file for complete search history.

(56) References Cited

U.S. PATENT DOCUMENTS

| 5,138,656 | A | * | 8/1992 | Shanes ..................... 379/167.11 |
| 5,604,341 | A |   | 2/1997 | Grossi et al. .................. 235/379 |
| 5,608,778 | A |   | 3/1997 | Partridge, III ................ 455/411 |
| 5,642,419 | A | * | 6/1997 | Rosen ............................ 705/76 |
| 5,754,655 | A |   | 5/1998 | Hughes et al. .................. 705/70 |

(Continued)

OTHER PUBLICATIONS

"Telemetrix, Inc. Receives Notice of Allowance for a Patent Application Directed to a Method of Automatically Collecting and Transmitting Telemetry Information", dated Dec. 13, 1999, PR Newswire, p. 0384. Extracted from Dialog.*

(Continued)

*Primary Examiner* — Hai Tran
(74) *Attorney, Agent, or Firm* — Dorsey & Whitney LLP

(57) ABSTRACT

Methods for consumers to pay at the point of sale by using a personal communicator to wire transfer funds out of their bank account. The communicator is coupled to, and exchanges signals with a reciprocating communicator of the seller, which in turn is coupled to the seller's bank. This way the money is transferred as an EFT payment code directly from the buyer's bank to the seller's bank, where it may be considered direct deposited, without processing delays. Devices also include vending machines that can receive payment this way. Bank computers are provided with systems and software for enabling the above. The bank computers are accessible by telephone lines, and work with cooperating banks by exchanging signals, for transferring the funds. The seller's bank generates a payment confirmation code that is ultimately transmitted to the seller's satisfaction for releasing the goods at the point of sale.

7 Claims, 18 Drawing Sheets

U.S. PATENT DOCUMENTS

| | | | | |
|---|---|---|---|---|
| 5,774,663 | A | 6/1998 | Randle et al. | 395/200.34 |
| 5,822,737 | A | 10/1998 | Ogram | 705/26 |
| 5,937,396 | A | 8/1999 | Konya | 705/43 |
| 6,073,801 | A * | 6/2000 | McGarrah | 221/298 |
| 6,076,075 | A * | 6/2000 | Teicher | 705/41 |
| 6,233,327 | B1 * | 5/2001 | Petite | 379/155 |
| 6,295,482 | B1 * | 9/2001 | Tognazzini | 700/233 |
| 6,408,284 | B1 | 6/2002 | Hilt et al. | 705/40 |
| 6,418,326 | B1 | 7/2002 | Heinonen et al. | 455/558 |
| 6,438,527 | B1 | 8/2002 | Powar | 705/40 |
| 6,816,724 | B1 | 11/2004 | Asikainen | 455/414.1 |
| 6,836,555 | B2 | 12/2004 | Ericson et al. | 382/116 |
| 6,868,391 | B1 * | 3/2005 | Hultgren | 705/17 |
| 6,912,510 | B1 | 6/2005 | Shepherd | 705/37 |
| 7,089,322 | B1 * | 8/2006 | Stallmann | 709/238 |
| 7,376,583 | B1 | 5/2008 | Rolf | 705/17 |

OTHER PUBLICATIONS

"Response to Non-Final Office Action dated May 7, 2012, filed Aug. 1, 2012", U.S. Appl. No. 12/753,734.

Non Final Office Action, U.S. Appl. No. 12/753,734, May 7, 2012.

"Non Final Office Action dated Oct. 17, 2012 received in U.S. Appl. No. 12/753,734".

Response to Non-Final Office Action filed Jan. 10, 2013, in U.S. Appl. No. 12/753,734.

* cited by examiner

350

510 — COUPLER ISSUES SIGNALS TO THE COMMUNICATOR ENCODING
A) THAT BUYER'S BANK SHOULD CONTACT SELLER'S BANK
B) IDENTIFICATION INFORMATION OF SELLER'S BANK, AND
C) ENCRYPTED SELLER'S BANK ACCOUNT NUMBER

520 — BUYER'S BANK CONTACTS SELLER'S BANK OVER SECOND COMMUNICATION LINK

530 — BUYER'S BANK TRANSMITS TO SELLER'S BANK THE SELLER'S BANK ACCOUNT NUMBER

540 — SELLER'S BANK DECRYPTS, THEN CONFIRMS SELLER'S BANK ACCOUNT NUMBER AS VALID

550 — SELLER'S BANK SIGNALS THAT SELLER'S BANK ACCOUNT NUMBER IS VALID, ELSE DISCONNECTS SECOND COMMUNICATION LINK

560 — BUYER'S BANK TRANSMITS AN EFT CODE TO SELLER'S BANK FOR SELLER'S ACCOUNT NUMBER

570 — SELLER'S BANK GENERATES PAYMENT CONFIRMATION CODE

580 — SELLER'S BANK TRANSMITS PAYMENT CONFIRMATION CODE TO BUYER'S BANK OVER SECOND COMMUNICATION LINK

590 — BUYER'S BANK ISSUES SOUND COMMAND: "PLACE COMMUNICATOR (TELEPHONE) AT VENDOR'S COUPLER" OVER FIRST COMMUNICATION LINK

FIG. 4

METHODS, DEVICES AND BANK COMPUTERS FOR CONSUMERS USING COMMUNICATORS TO WIRE FUNDS TO SELLERS AND VENDING MACHINES

CROSS REFERENCE TO RELATED APPLICATIONS

This application is a continuation of U.S. patent application Ser. No. 10/182,177, filed Jul. 24, 2002, U.S. Pat. No. 7,720,756, which is a U.S. National Phase of PCT/US01/00144, filed Jan. 2, 2001 which claimed the benefit of U.S. Provisional Application No. 60/228,951, filed Aug. 28, 2000, and was a continuation of U.S. application Ser. No. 09/525,575, now abandoned filed Mar. 15, 2000, which claimed the benefit of U.S. Provisional Application No. 60/178,262, filed Jan. 25, 2000, all of which are hereby incorporated by reference.

BACKGROUND OF THE INVENTION

1. Field of the Invention

The present invention is related to the fields of fund transfers by consumers, consumer device and bank systems and softwares that enable the same, and vending machines that accept the same.

2. Related Art

There are various methods for consumers to pay money for goods and services. One of them is by writing checks. But processing checks costs a lot of money. Another way to pay is with charge cards, such as credit cards, debit cards, etc. But these also have a high cost of handling. In addition, the payees do not receive credit right away. Further, charge cards can be lost or stolen, and then used fraudulently.

Another, more consistent drawback of the prior art is that the buyer and seller have to agree on using a compatible method of payment. Some sellers do not take checks. Some buyers do not have credit cards, etc.

The incompatibility is proliferating, even though new forms of cash and payment are emerging. For example, electronic wallets have emerged, that themselves store money. Money so stored does not earn interest.

BRIEF SUMMARY OF THE INVENTION

The present invention overcomes these problems in the prior art.

Generally, the present invention provides methods for consumers to pay by wire transferring money or credit out of their bank account.

According to a method of the invention, the consumer uses a device, such as a telephone or other communicator, to access his agent in real time. The consumer's agent can be an electronic wallet at home, or a financial institution.

The seller's agent is also accessed. This can be accomplished by the seller using a communicator, and/or connecting a coupler to a telephone line, and dialing a telephone number of his financial institution.

The communicators can be telephones communicating by sound signals. Or they can be more advanced personal digital assistants that communicate by infra red light signals, or by radio frequency signals. A coupler can be used to enhance their communication. Moreover, the devices can be made to exchange direct current electrical signals.

When the buyer agrees on the price to be paid, he couples his device to the seller's device, possibly through a coupler. This way the consumer's agent can communicate with the seller's agent, such as with sound signals. Then the consumer's agent transfers the money or credit to the coupler electronically, and thus to the seller's agent. The receiving party can transfer a confirmation payment code. If it is banks, they can create an email message.

The invention also provides devices for implementing some of the methods. Practically, such devices are to be provided primarily by the seller. The devices include a telephone coupler for retrofitting with, or implementing in conjunction with various types of cashier devices. The coupler preferably includes a docking bay for a buyer to place a communicator, and from where to exchange signals with it.

The coupler of the invention can be used with the cashier device of a vending machine, for releasing goods. The cashier device releases the goods when a confirmation of payment is received from the telephone, which has been encoded by the seller's bank after receiving funds. It can also be used with a parking meter, etc.

The telephone coupler of the invention can also be used with cash registers that do not use a telephone line connection to their own bank. The cashier enters the amount of the transaction in the cash register, which also displays it. When the buyer agrees with the amount, she places her cellular telephone to a docking bay of the coupler, which enables the payment.

In another embodiment, the coupler has a second docking bay, for the seller to place their own telephone device. The seller dials simultaneously their own bank, over a second communication link. This way the buyer's bank transmits funds to the seller's bank by communicating over two communication links through the coupler.

The invention also provides bank computers with softwares for enabling the above. The computers are accessible by telephone lines, and have software for validating a code authorizing purchasing from an account. The computers are capable of interfacing by exchanging signals with a cooperating seller's bank, for transferring funds to it. The seller's bank generates a payment confirmation code that is ultimately transmitted to the seller's satisfaction for releasing the goods.

The invention obviates the need for using checks and processing them, which lowers transaction costs. The invention can bypass credit cards, which saves on transaction costs.

Funds wire transferred according to the invention may be considered direct deposited, without processing delays. After all, the exchanged money is always in a bank, where it can earn interest.

It will be appreciated that the invention also permits transactions from mixed authorities, such as from a buyer's credit card to a seller's direct funds, or to an electronic wallet, etc.

Most importantly, the invention enables purchases to be made by a simple cellular telephone, whose use is proliferating. And even when a consumer does not have, or has forgotten his cellular telephone, a vendor can have an available telephone near the coupler of his cashier.

As such, the consumer has to make no change, or buy no new device. The present invention does not depend on broad consumer acceptance. As long as a few financial institutions agree on a single communication standard, such as interface communications, coding, etc., then all their consumers will be automatically compatible. And the banks have every reason to agree, so that they can collectively realize very large savings in operating costs.

Another advantage of the invention is that, in some embodiments, a display is not needed. The feedback can be auditory, when telephones are used.

A key advantage of the invention is that banks do not need to deploy and maintain specialized hardware, such as Automated Teller Machines (ATMs), or specialized kiosks, etc.

The invention will become more readily apparent from the following Detailed Description, which proceeds with reference to the drawings, in which:

BRIEF DESCRIPTION OF THE DRAWINGS

FIG. 4 is a flowchart for illustrating a first embodiment of a specific box of the flowchart of FIG. 3 that uses a chain of two party telephone calls.

DETAILED DESCRIPTION OF THE PREFERRED EMBODIMENT(S)

Figure 1:
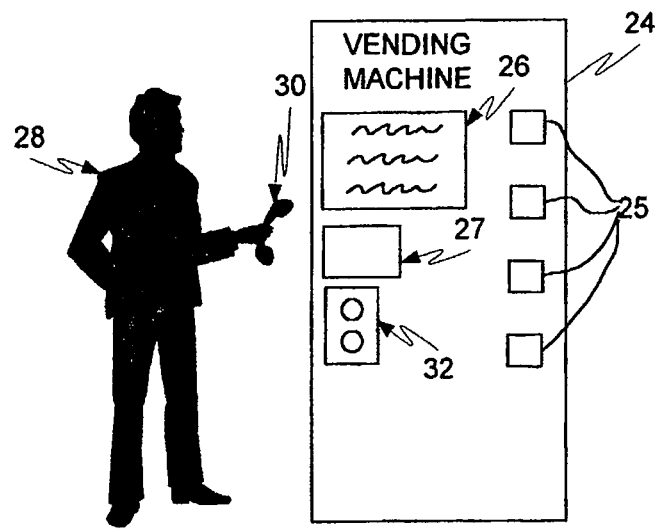
FIG. 1 illustrates a buyer using a cellular telephone to make a purchase from an automated vending machine with preset prices according to a method of the invention.

As has been mentioned, the present invention provides methods, devices and bank computers with softwares for a consumer to wire transfer money, or authorize payment of money to a seller for purchases, at the point of sale. In the preferred embodiment, the consumer uses a device, such as a telephone, to access his bank account, and then couples the device to a cooperating coupler of the seller. The seller accesses his, and then they couple their telephones. This way the buyer's bank transfers money to the seller's bank.

In this description, although only the preferred embodiments are described, it will be appreciated that there can be many variations. Moreover, as this document speaks to methods, devices, softwares, etc., it is to be understood as a whole. Some of the individual enabling descriptions are made shorter, because a collateral part of them may be contained in a description of another associated individual description.

In this document, by "buyer" or "consumer" is meant any form or type of payor, or someone who owes payment, or is making payment. By "seller" or "vendor" it is meant any form or type of payee, whether receiving payment on the spot, or is due payment, human or automated (such as a vending machine), etc. By "bank" it is meant any institution authorized to hold money for any of the parties. It is also meant any institution to transact credit transactions, such as the well known credit card institutions, e.g. MasterCard®, Visa®, American Express 6, Discover®, etc. By "call" it is meant a telephone call or request for establishing a communication link over any type of communication channel.

Methods of the invention are now described in more detail.

In general, the invention provides a method for a consumer to make a payment to a vendor. The method comprises establishing over a telephone line a first communication link between a communicator and an automated agent of the consumer that is located remotely to the consumer.

The automated agent of the consumer can be a bank, a credit institution, etc., or simply an electronic wallet. The automated agent of the consumer can be present (as part of a cashier), or remote accessible electronic wallet at a safe location such as the home, office, etc.

Although mention is made to telephones, the invention is not so limited. Wherever telephone is mentioned, a communicator is meant, that can hold a telephone line. The communicator can be a telephone, such as a portable telephone. In addition, an electronic wallet, personal digital assistant, or equivalent device that can act as a telephone can operate as a communicator according to the present invention. In addition, the communicator of the invention includes composite devices, such as those that combine a telephone with a personal digital assistant.

The communicator includes transducers for converting signals from the telephone line to signals for the third communication link with the coupler. If the communicator is a telephone, the transducers are for sound, namely a speaker and a microphone. If the communicator includes an infrared port, the transducers include an IR detector and generator, such as an IR LED. If the communicator communicates with radio frequency (RF) signals, it includes an RF port, with the transducers including a RF detector and a RF generator. The advantage of using RF is That no special physical coupling is needed—physical proximity is enough.

If the communicator uses DC signals for coupling with the other communicator, then the port can be two metal protrusions in each device, that are to be brought in contact with those of the other device. The interface would be preferably according to a widely acknowledged interface protocol. Such protocol could include very high input impedances, standardized voltage levels, etc. In that case the transducer converts the telephone signals to direct current (DC) electrical signals according to the protocol, and the need for the coupler can be obviated. Many other aspects would be as described herein.

The communicator is used to call the consumer's agent over a telephone line, or other communication link, known as a first communication link. The first communication link can be a multi-legged one. For example, as a first leg he can call a secured call forwarding device from home, e.g. using a speed dialer. Then the device can call the bank. Or he can email such a secure device, which can in turn call the bank. In each case, the first communication link uses a telephone line for at least one of the legs, whether it is multi-legged or single legged. If the communicator is a composite device, the first leg can be between a telephone component of the device and a RF port of the device, in other words, within the composite communicator.

Preferably it is the consumer that calls the agent. The consumer can dial on the telephone an access code related to a prearranged account of the consumer with the buyers' agent. Alternately, he calls the bank, issues a prompt, and then hangs up. The prompt can include a password, a return telephone number, or even a distress code. The bank can verify the customer, and then call back, to perform the remaining steps.

A communication link is also known as comlink. In this context, the words "first", "second" and "third" are merely convenient labels. As such, there is no requirement that a "first" comlink be established before a "second", etc.

While the first communication link is by a telephone line, there is no such requirement for any of the other communication links that are taught by the present invention. In some instances they are over sound, light (such as IR), RF, etc. They can even be over direct computer lines, or asynchronous, such as email. When the links are by telephone lines, they can be either through regular telephone lines, or through networks, such as Voice over Internet Protocol, etc.

The method also comprises contacting an automated agent of the vendor over a second communication link concurrently with the first communication link being established. The automated agent of the vendor can be a bank, a credit institution, etc., or simply an electronic wallet, present (as part of a cashier), or remote accessible electronic wallet at a safe location such as the home, office, etc. The latter option is described with reference to FIG. 9 later in this document. For better security, the vendor can prearrange the consumer's agent to be configured for only receiving funds this way.

As will also be seen below, contacting can be by either the coupler establishing the second communication link, or by the buyer's agent establishing that link. The second comlink is preferably concurrent with the first, although that is not necessary. It is preferred that the second comlink is a telephone link.

The second link can be hearable from the first, i.e. a conference call. Conference calls are currently more expensive than regular calls. In any event, it is preferred to have the second comlink permit synchronous communication. In other words, email is disfavored because of unpredictability (networks can be congested, etc.).

The method includes transmitting to the vendor's agent an access code related to a prearranged account of the vendor with the merchants' financial institution. If this goes through an instrumentality of the consumer, it is best to encrypt it at the origin, and decrypt it at the destination.

The method also comprises coupling the buyer's communicator with the seller's communicator. This can be direct, or through a coupler. In other instances, the coupler is preset to cooperate with the vendor's agent, and in some embodiments the seller's communicator is not needed.

The coupler is also known as handshake implement. It can includes a docking station for receiving the communicator. The docking station, otherwise known as dock bay or just dock is for docking the communicator.

The coupler is adapted to the form of communication, i.e. to the type of signals that can be exchanged. If the signals are voice signals, the coupler is also known as telephone coupler. If the signals are IR light signals or RF signals, the coupler is built accordingly.

Coupling establishes a third communication link between the coupler and the communicator, at the same time as the first communication link is established. If the communicator is a telephone, the third communication link is by sound signals.

The method also comprises the consumer's agent transmitting a payment authorization code to the vendor's agent over the second communication link, to effectuate the payment. In general, the banks exchange codes that go through the established comlinks. At the nodes there cart be a change, where an electrical signal through telephone lines can be converted to a corresponding sound or IR signal, etc. Those are coded preferably according to a uniform protocol. That protocol preferably includes instructions for how to code, whether the EFT payment code is to be transmitted over the first communication link, or whether the consumer's agent is to establish a second comlink.

The method includes also other elements, such as entering an amount of the payment. Entering can be from the keypad of a cellular telephone, or a keypad. The keypad can be associated with the coupler.

The method includes also other optional elements, such as entering a currency code, for denoting a currency unit associated with the amount. This feature is particularly useful for international travelers.

Once entered, the amount can be displayed. The consumer avails the communicator for coupling only after the consumer agrees with the displayed amount.

The method also includes the consumer's agent verifying that the transmitted (and requested) amount comports, or is within a spending limit of the consumer. That is either a credit limit, a cash balance, or other spending limit, depending on the arrangement.

The method preferably includes transmitting over the first communication link a mode code, denoting whether the EFT payment code is to be transmitted over the first communication link, or whether it is the consumer's agent that is requested to establish a second comlink.

A method according to the invention can accommodate either one of these two different types of transactions. But the preferred embodiment is accommodating both. The above described mode code permits both.

If the consumer's agent is to establish the second comlink, the coupler transmits to the consumer's agent information for contacting the vendor's agent. Then the consumer's agent uses the contact information for addressing the vendor's agent to establish the second communication link. The second comlink can be by telephone. Then the vendor's agent can generate a payment confirmation code for transmitting to the consumer's agent over the second communication link, and the consumer's agent can retransmit the payment confirmation code over the first communication link to the communicator for issuing to the coupler.

If the coupler establishes the second comlink, the consumer's agent transmits the payment authorization code over the first communication link, from the communicator to the coupler, and then through the second communication link. Then the vendor's agent can generate a payment confirmation code for transmitting to the coupler over the second communication link.

Figure 6:
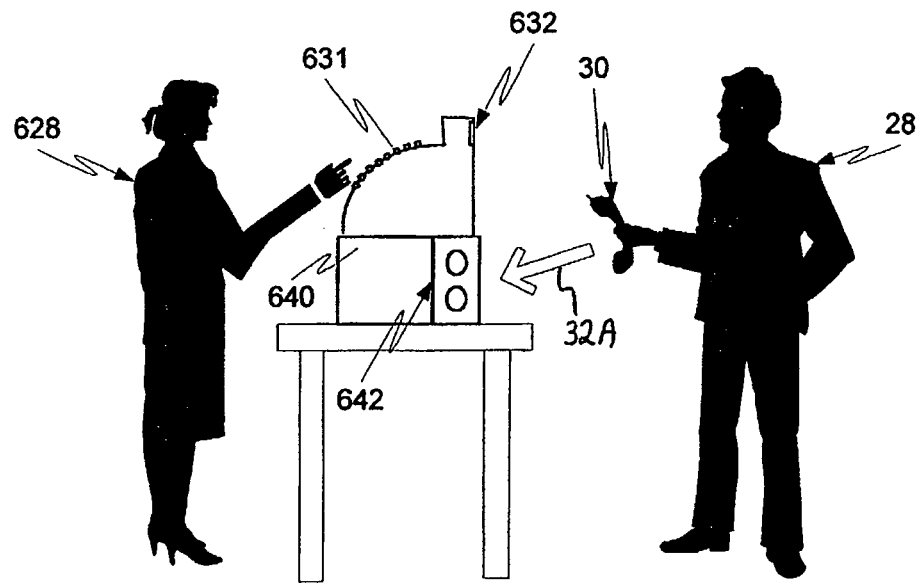
FIG. 6 illustrates a buyer using a cellular telephone to pay a street vendor according to a method of the invention.

Methods of the invention are now described in more detail. The methods are chosen for illustrating specific embodiments and capabilities of the invention. The vending machine of FIG. 1 is an example of an unattended automated cashier. The street vendor of FIG. 6 is an example of a seller that is telephonically disconnected from the ability to receive authorization for a credit card that is tendered for payment, and thus is vulnerable to fraud. It will be appreciated that the invention gives him the option of direct depositing his revenue, without even having to come into the bank to occupy a teller. Thus he need not worry about losing the money he is collecting. The establishment of FIG. 10 need not have machines for checking credit cards, only a common telephone line and a dual coupler.

Methods are first described for a consumer to purchase from a vending machine, that has no attendant, with reference to FIGS. 1-5.

Referring to FIG. 1, a vending machine 24 according to the invention has selections 25, an instruction plaque 26, and a price display 27. The instructions on the plaque 26 can read in full: "SELECT PRODUCT BY PRESSING BUTTON. THIS DISPLAYS THE PRICE OVER THE COUPLER. DIAL YOUR BANK, AND THEN DOCK YOUR TELEPHONE ON THE COUPLER. YOU WILL BE CHARGED THE DISPLAYED AMOUNT."

Importantly, the vending machine 24 has a docking bay 32 for receiving a telephone OT other communicator according to the invention. The docking bay 32 is part of a coupler that is not shown otherwise. The preferred docking bay 32 has insulation suitable for the intended mode of communication. It has an opening 29 for receiving the speaker of the telephone, and an opening 31 for receiving the microphone. Each of openings 29, 31 is preferably padded with foam to eliminate outside noises and cross talk, and is also known as receptacle.

A consumer 28 is dialing on a communicator 30, such as a portable telephone 30, or composite personal digital assistant 30 that includes a telephone. This accesses his bank, which is remotely locates and not shown. The consumer 28 places the communicator 30 on the docking bay 32 according to arrow 32A.

Figure 2:
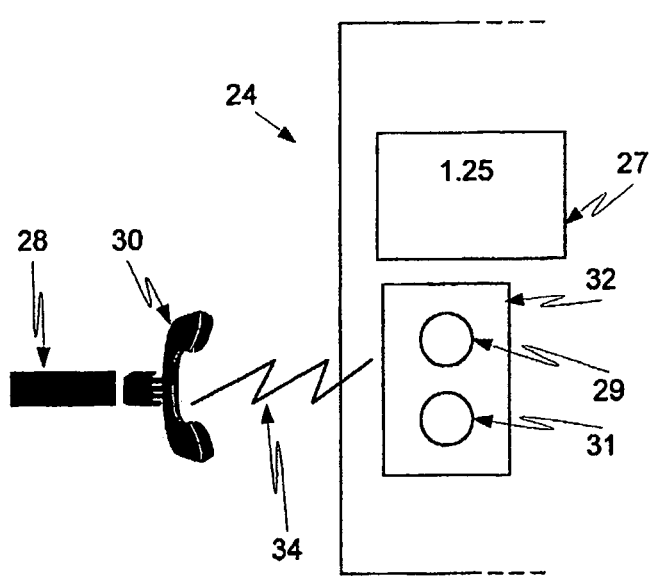
FIG. 2 is a close up view of FIG. 1 to illustrate a buyer coupling his cellular telephone to the coupler of the vending machine.

FIG. 2 is a close up view of FIG. 1, to illustrate the hand of the consumer 28 about to couple his portable telephone 30 to the coupler 32 of the vending machine 26. That is after the bank has been accessed, and will establish a third comlink 34.

The vending machine 24 can be a machine for a variety of goods and services, namely food items, gasoline, software, newspapers, music media, etc. It can be an automated meter, such as one a parking meter (and the goods are parking time). It can also be an Automated Teller Machine (ATM), and where the goods of the vending machine is cash.

The vending machine 24 has a releasing mechanism for allowing access to the goods. It also includes a transducer for accepting signals from a communicator, such as the telephone 30. It also has a system for interpreting codes from the signals, and for activating the releasing mechanism when the interpreted codes match preset codes. If the communicator is a telephone, then the transducer can be a microphone. The system can include a pattern recognition system, implemented by a microprocessor interpreting the electrical signals that the transducer generates.

The vending machine 24 additionally preferably includes a speaker for issuing sound signals to the communicator. The price is preferably displayed for the goods, and the sound signals encode the price. In other embodiments, the consumer 28 dials in the price from the telephone 30. The vending machine 24 either includes an electronic wallet, or makes a telephone connection to its owner's bank account. Alternately, the vending machine 24 sends sound signals that encode an instruction for the consumer's agent to transfer money to an indicated seller's agent. That is preferred for when the consumer's agent is a financial institution.

Figure 3:
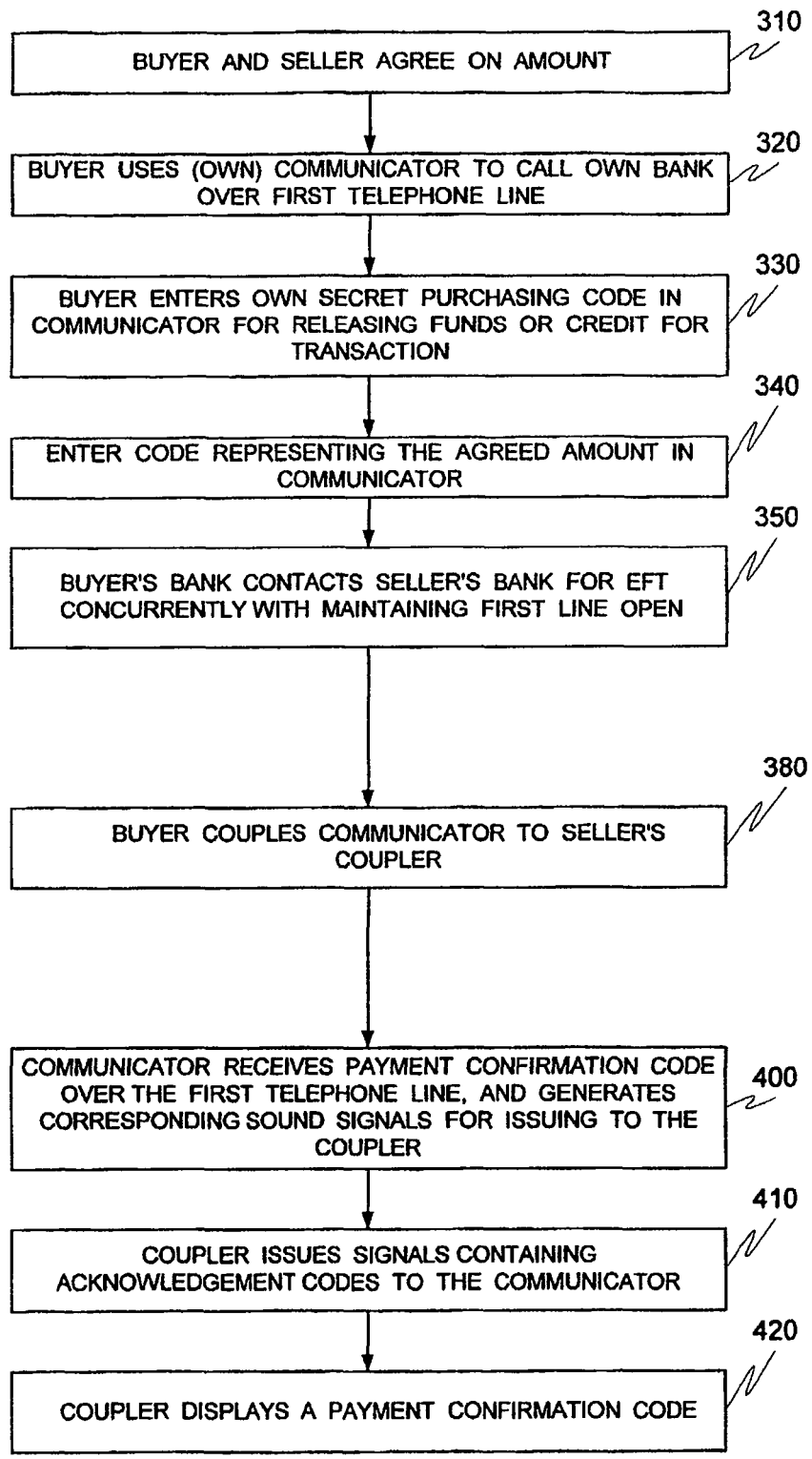
FIG. 3 is a flowchart for illustrating the method of FIG. 1.

Referring to FIG. 3, a flowchart 300 illustrates the method of FIG. 1. It includes boxes 310, 320, 330, 340, 350, 380, 400, 410 and 420. The method includes performing the steps or acts written in all such boxes in this description. These do not have to be performed in that exact order, and can be substituted with equivalents. After step 420, the vending machine 30 releases goods.

The confirmation can be acknowledged in a number of ways. For example, there can be a new message in the display, such as the word "PAID".

The steps described above include many optional steps. This communication should be according to a strict protocol, that may allow additional optional acknowledgement codes.

FIG. 4 is a flowchart for illustrating a first embodiment of box 350 of the flowchart of FIG. 3 that uses a chain of two party telephone calls. This is given by boxes 510, 520, 530, 540, 550, 560, 570, 580, 590. The method includes performing the steps or acts written in these boxes. Again, these do not have to be performed in that exact order, and can be substituted with equivalents.

Figure 5:
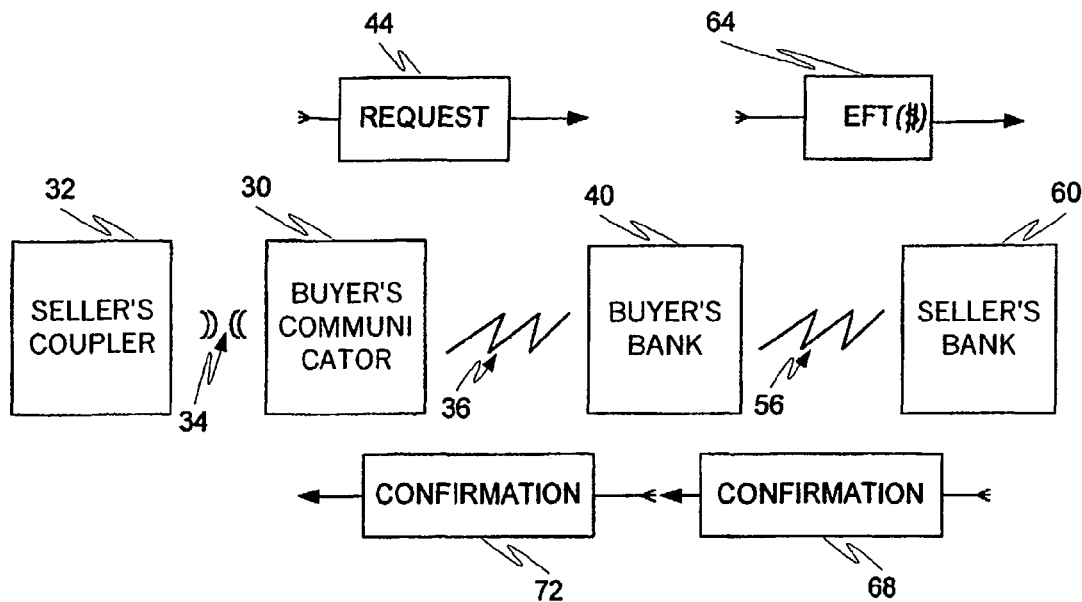
FIG. 5 is a diagram illustrating a telephone connection scheme between the parties' banks for the embodiment of FIG. 4.

FIG. 5 is a diagram illustrating a connection scheme between the parties' banks for the embodiment of FIG. 4. As can be seen the buyer's communicator 30 reaches the buyer's bank 40 over the first comlink 36. A request 44 comes to the buyer's bank 40 to establish the second comlink 56 with the seller's bank 60. The EFT 64 is always from the buyer's bank (also known as consumer's agent) to the seller's bank or agent. "EFT" in this document means Electronic Fund Transfer, or electronic credit transfer. Then a confirmation 68 goes from the seller's bank 60 to the buyer's bank 40 though the second comlink 56. Then a resulting confirmation 72 (typically identical to confirmation 68) is retransmitted from the buyer's bank 40 through the first comlink 36 to the buyer's communicator 30. The confirmation becomes a signal through the third comlink 34 to the coupler 32. The type of signal depends on the type of communicator.

The coupler 32 checks the code as originally produced by the seller's bank 60, and then releases the goods. If there is an error, such as no more goods in the vending machine 26, the coupler 32 can transmit back through the same channels a credit memo.

For performing these steps, designer choices have to be made. If the communicator is a telephone, one such choice is whether the codes be DTMF codes or other. (DTMF is the Dual Tone Multi Frequency standard or format.) If the buyer needs to dial in a secret code for accessing his account (as is highly recommended), that transmission is easiest done by DTMF signals. The buyer may also be able to dial in the price. But it is far preferred that as much entering as possible is done by machines. So, the coupler can dial in the price, as part of the request 44. Since DTMF detection and generation may have to be included anyway for telephone dialing purposes, it maybe economically disadvantageous to include other components for other types of signals.

Methods are now described for purchasing from a live merchant, but who is telephonically disconnected from his bank. Referring to FIG. 6, a merchant 628 enters a price in a cash registry 631 according to the invention, which has a display 632. The cash registry 631 is connected to a coupler 640 that has a docking bay 642. When the buyer 28 agrees with the price entered and shown on display 632, he inserts his portable communicator 30 in the docking bay 642.

Figure 7:
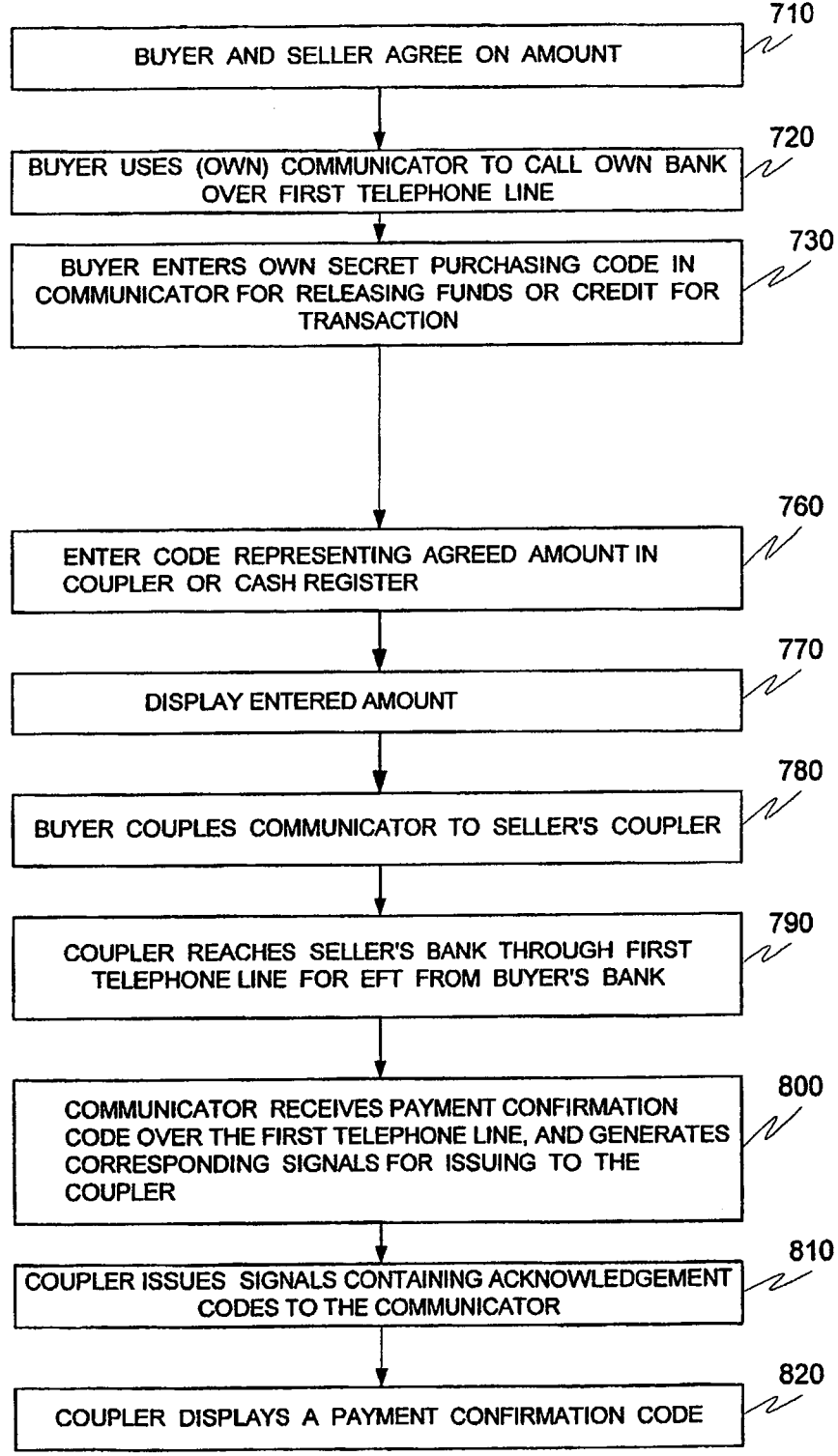
FIG. 7 is a flowchart for illustrating the method of FIG. 6.
Figure 8:
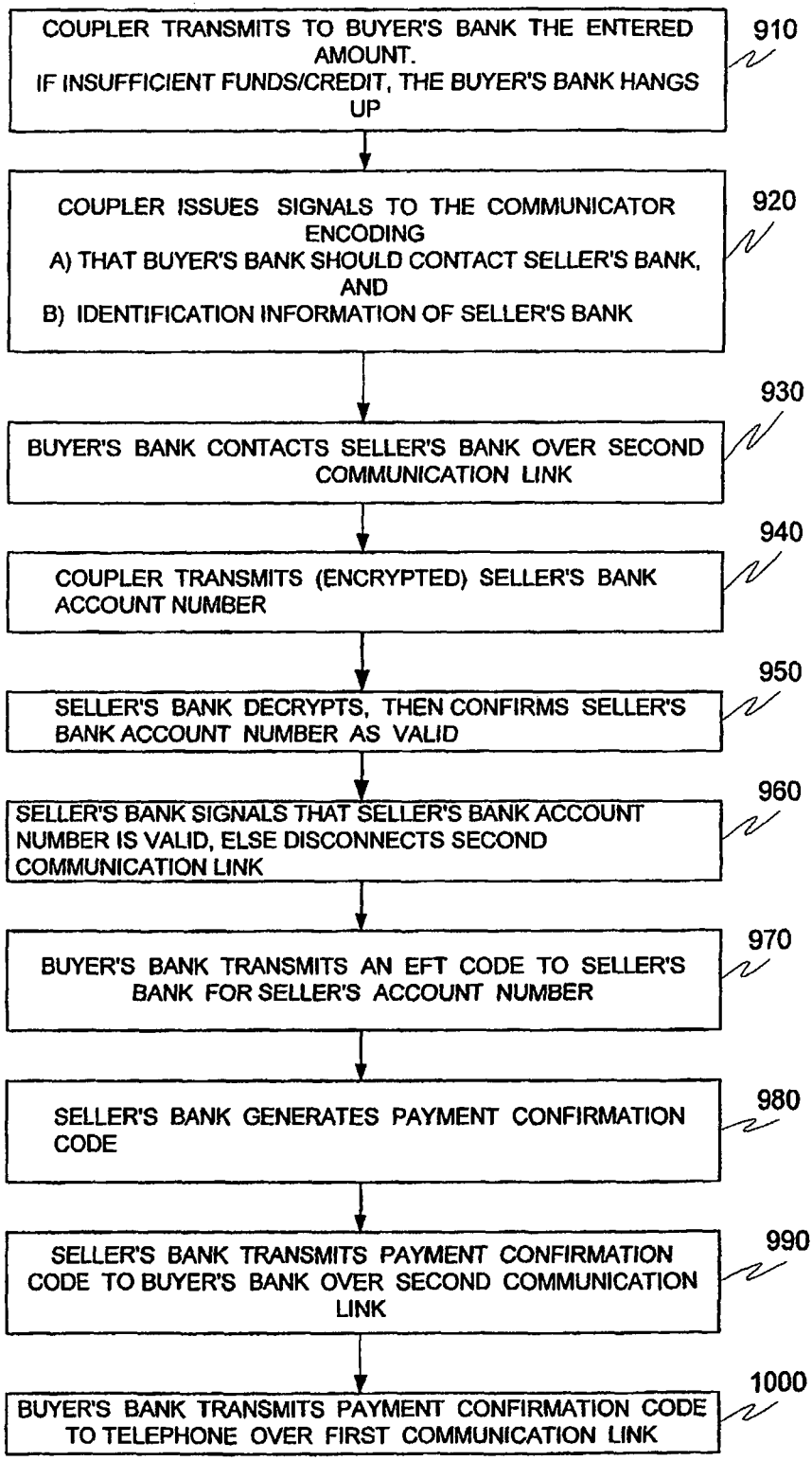
FIG. 8 is a flowchart for illustrating a first embodiment of a specific box of the flowchart of FIG. 7 that uses the telephone connection scheme of FIG. 5.

The method of the invention is generally similar to what is described above, and establishes a connection of the type of FIG. 5. The method is described by the flowchart 700 of FIG. 7, namely boxes 710, 720, 730, 760, 770, 780, 790, 800, 810 and 820. The method includes performing the steps or acts written in these boxes. Similarly numbered boxes are analogous to those of FIG. 3. In addition, box 790 is best performed as shown in FIG. 8, with boxes 910, 920, 930, 940, 950, 960, 970, 980, 990, 1000. The method includes performing the steps or acts written in these boxes.

Figure 9:
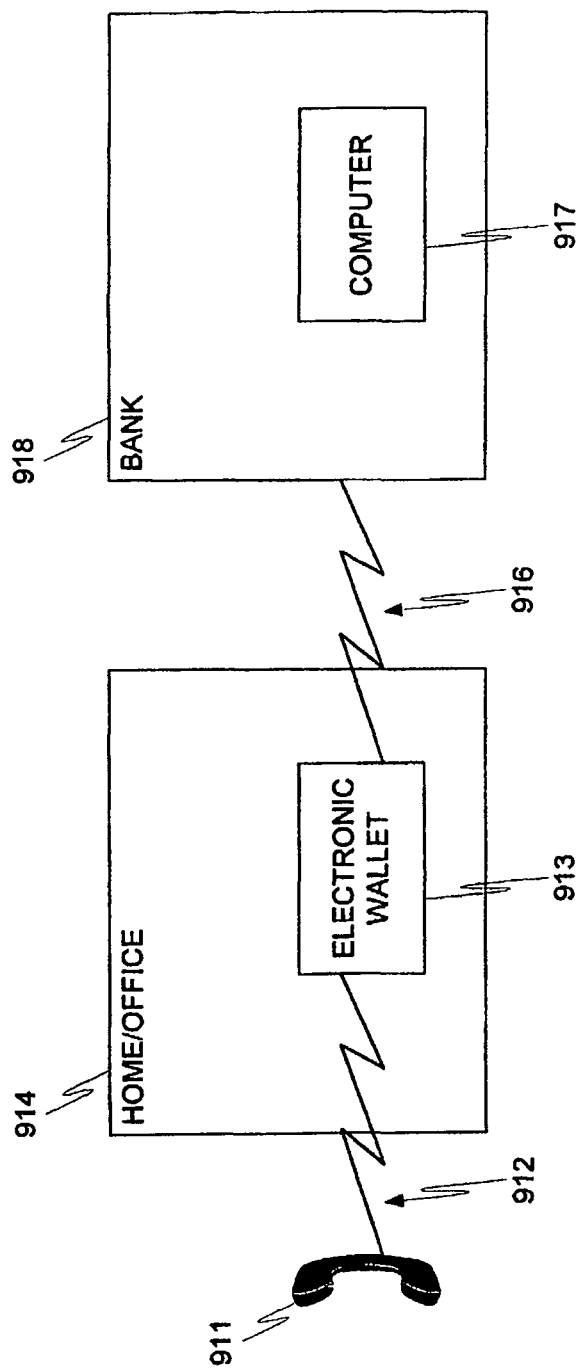
FIG. 9 is a diagram illustrating a telephone connection scheme between either party and its home wallet, for various embodiments of the invention.

FIG. 9 illustrates use, by either a buyer or a seller of a home electronic wallet, according to methods of the invention. The telephone 911 can be either the buyer's telephone (shown as 30 in FIG. 6), or a seller's telephone (shown as 952 in FIG. 10 below). The telephone 911 establishes a comlink 912 with an electronic wallet 913 in a home 914. The electronic wallet 913 later establishes a comlink 916 with a computer 917 of a bank 918, for recharging the wallet, etc. The embodiment of FIG. 9 has the advantage that the electronic wallet 913 can perform individualized, and thus more secure checks on an incoming call along a comlink 912. The disadvantage is that money in an electronic wallet does not draw interest, plus there are compatibility issues that will have to be resolved between the electronic wallet 913 and the computer 917.

Figure 10:
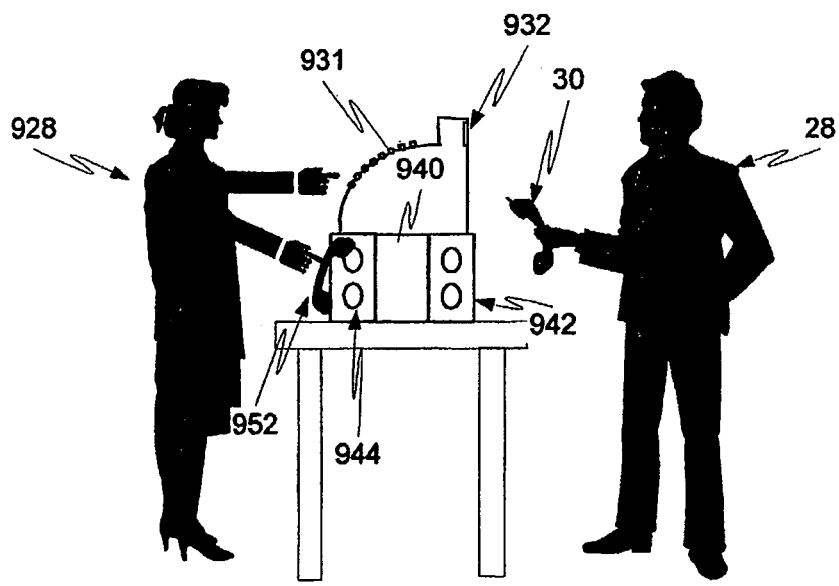
FIG. 10 illustrates a buyer suing a cellular telephone to pay, according to a method of the invention, a store that has an independent telephone line to the store's bank, and a dual coupler for being used by both the buyer and the seller, each for accessing their account.

Another method is now described for purchasing from a live merchant who is in telephone contact with his bank. Referring to FIG. 10, a merchant 928 enters a price in a cash registry 931 according to the invention, which has a display 932. The cash registry 931 is connected to a dual coupler 940 that has a buyer's docking bay 942 and a seller's docking bay 944.

The seller 928 dials his own bank (not shown) with his telephone 952, to establish a comlink with it. Again, when the buyer 28 agrees with the price entered and shown on display 932, he inserts his cellular telephone 30 in the docking bay 942. The two telephones 30 and 952 communicate with each other via the dual coupler 940.

The coupler amplifies the signals, but is not actually necessary. If a price is entered from either one of the telephones, and the telephones are brought together, they can operate without the coupler.

Figure 11:
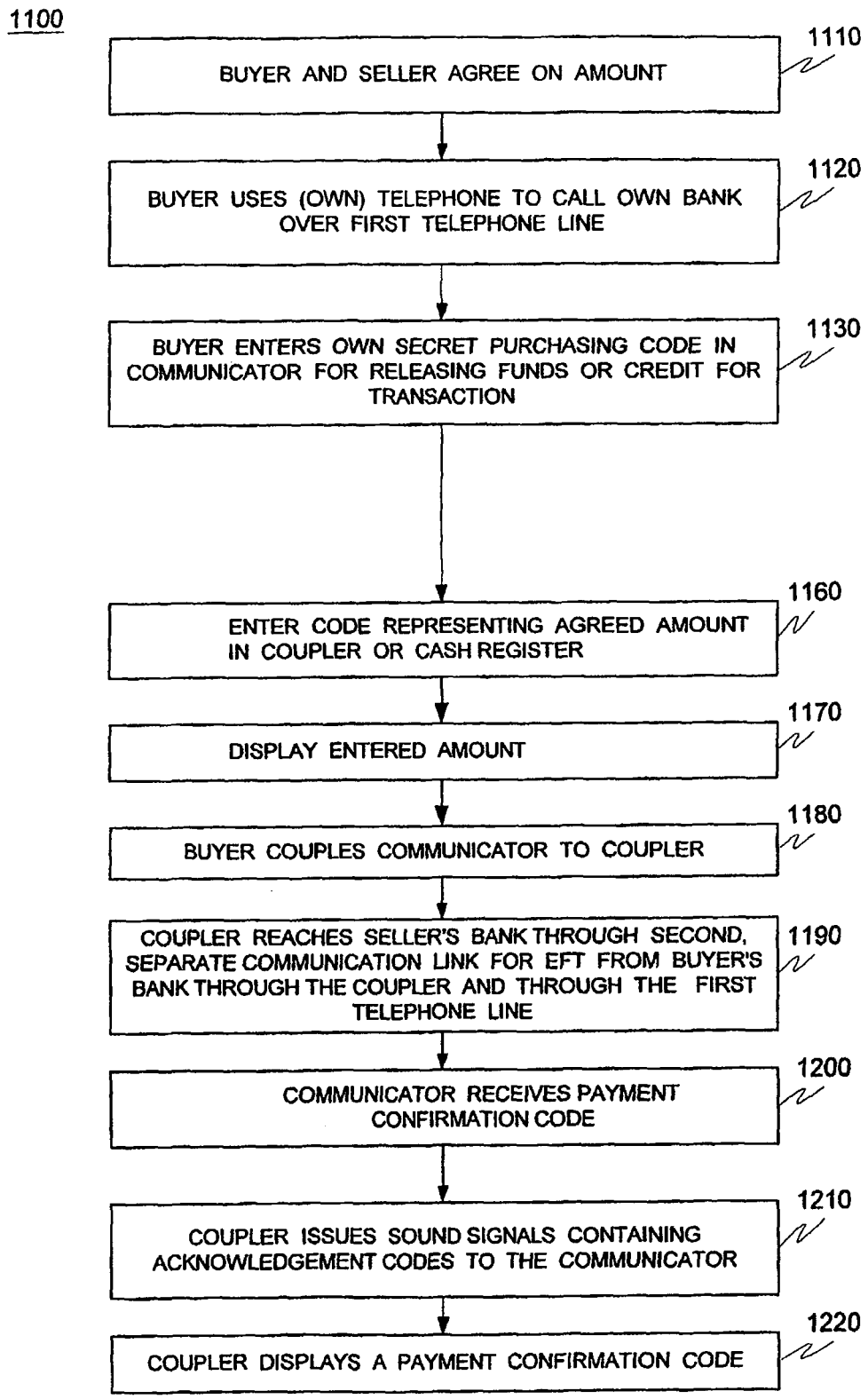
FIG. 11 is a flowchart for illustrating the method of FIG. 10.
Figure 12:
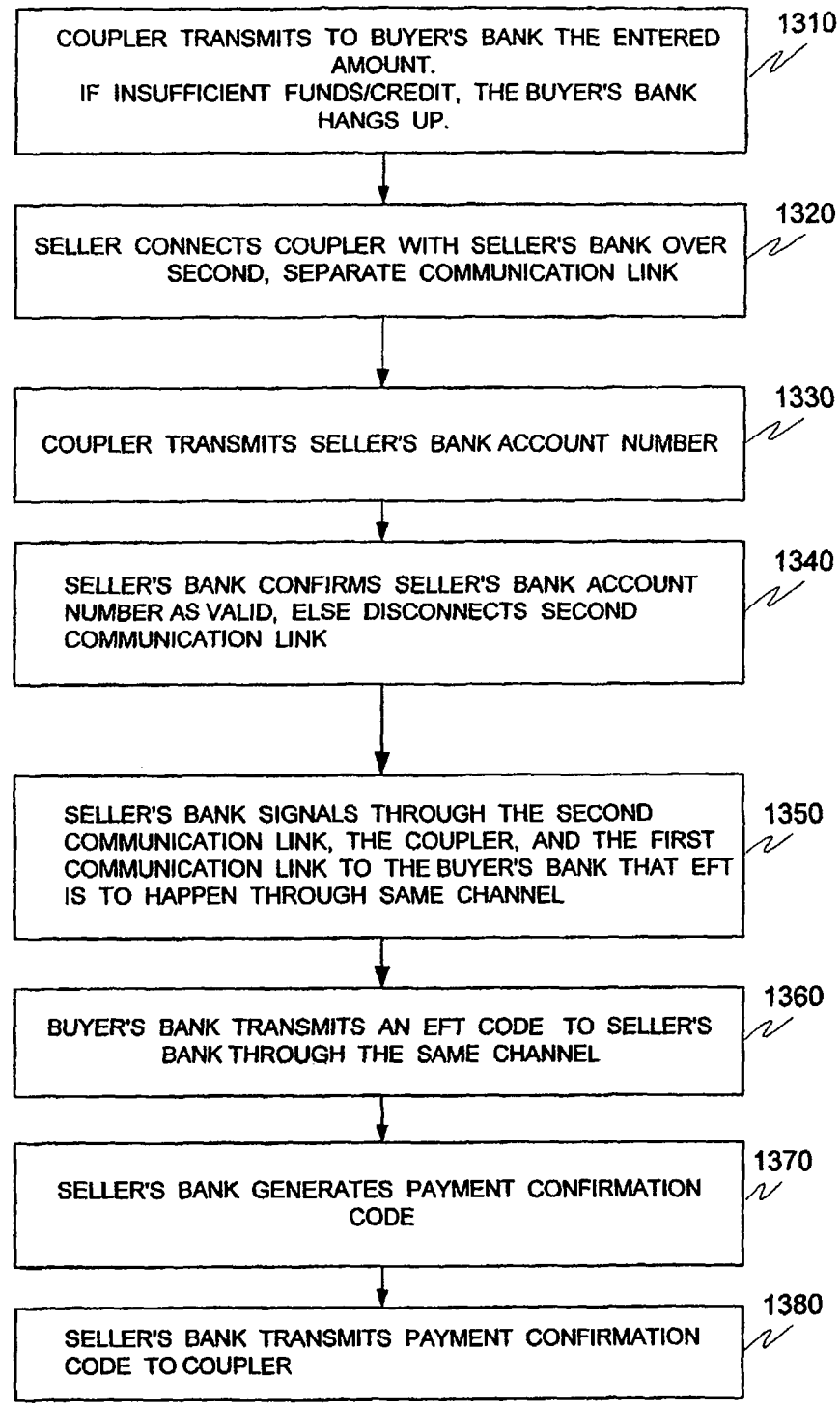
FIG. 12 is a flowchart for illustrating an embodiment of a specific box of the flowchart of FIG. 11.

A method of the invention is described by the flowchart 1100 of FIG. 11, namely boxes 1110, 1120, 1130, 1160, 1170, 1180, 1190, 1200, 1210 and 1220. The method includes performing the steps or acts written in these boxes. Similarly numbered boxes are analogous to those of FIG. 7. In addition, box 1190 is best performed as shown in FIG. 12, with boxes 1310, 1320, 1330, 1340, 1350, 1360, 1370, 1380. The method includes performing the steps or acts written in these boxes.

Figure 13:
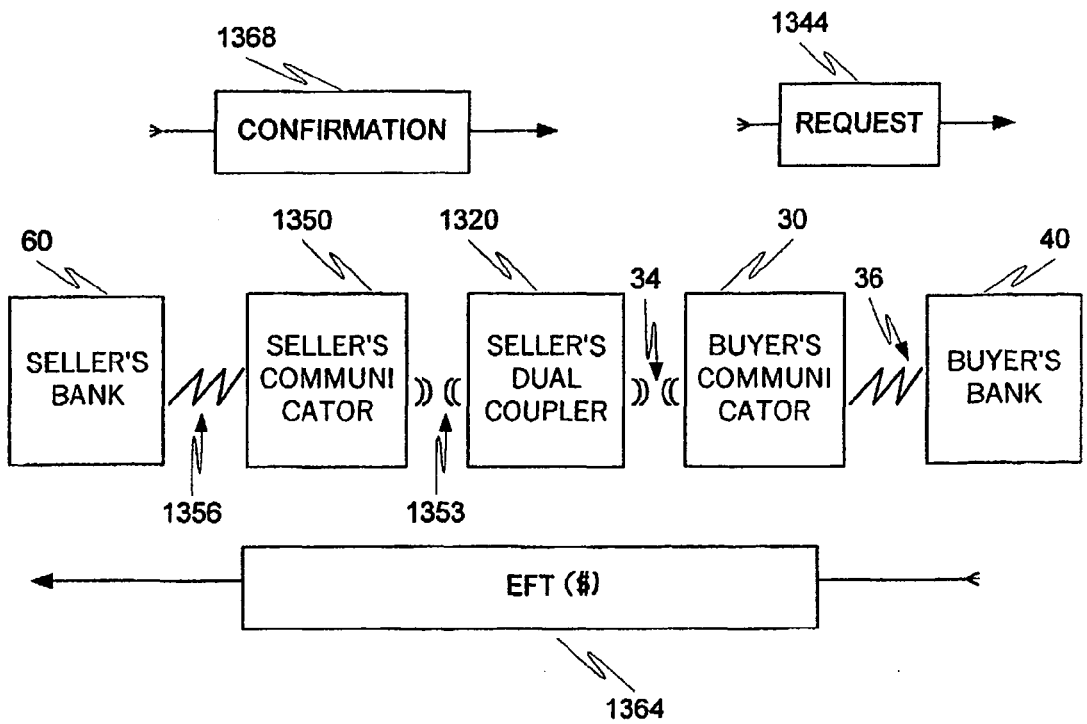
FIG. 13 is a diagram illustrating a telephone connection scheme between the parties' banks for the embodiment of FIG. 12.

This method of the invention is generally similar to what is described above, and establishes a connection of the type of FIG. 13. Namely, the buyer, through his communicator 30 contacts his bank 40 with a link 36 as in FIG. 5 above. In addition, the buyer's communicator 30 makes a comlink 34 with seller's dual coupler 1320 (the same coupler is shown in FIG. 9 as dual coupler 940). Returning to FIG. 13, the seller's communicator 1350 (shown in FIG. 10 as 952) makes a comlink 1353 with the seller's dual coupler 1320. The seller's communicator 1350 also has a concurrent comlink 1356 with seller's bank 60.

The request 1344 is transmitted through telephone comlink 36 to the buyer's bank 40. The buyer's bank 40 transmits the EFT payment code 1364 to the seller's bank 60.

In turn, the seller's bank 60 transmits a confirmation payment code 1368 to seller's dual coupler 1320, and the cash register displays "PAID" or equivalent. Then the vendor knows that payment has been received, and then the goods or services must be delivered.

It is highly preferred that the confirmation payment code 1368 is also transmitted to the buyer's bank 40, as a further confirmation. This may be useful if there is a question of refund, or payment in the first place.

The mode of FIG. 13 is the preferred mode of the invention. But for vending machines, the mode of FIG. 5 may be the most economical option. Indeed, it does not require that they have a telephone connection to anything. If the vending machine is made with an electronic wallet, then the mode of FIG. 13 is also available.

As said above, the dual coupler is not necessary. The two telephone devices can achieve coupling without the assistance of a coupler, or the intervention of a cash register. If the connection is good, the dual coupler 1320 will not be needed, and the comlinks 1353, 34 may be combined.

Figure 14:
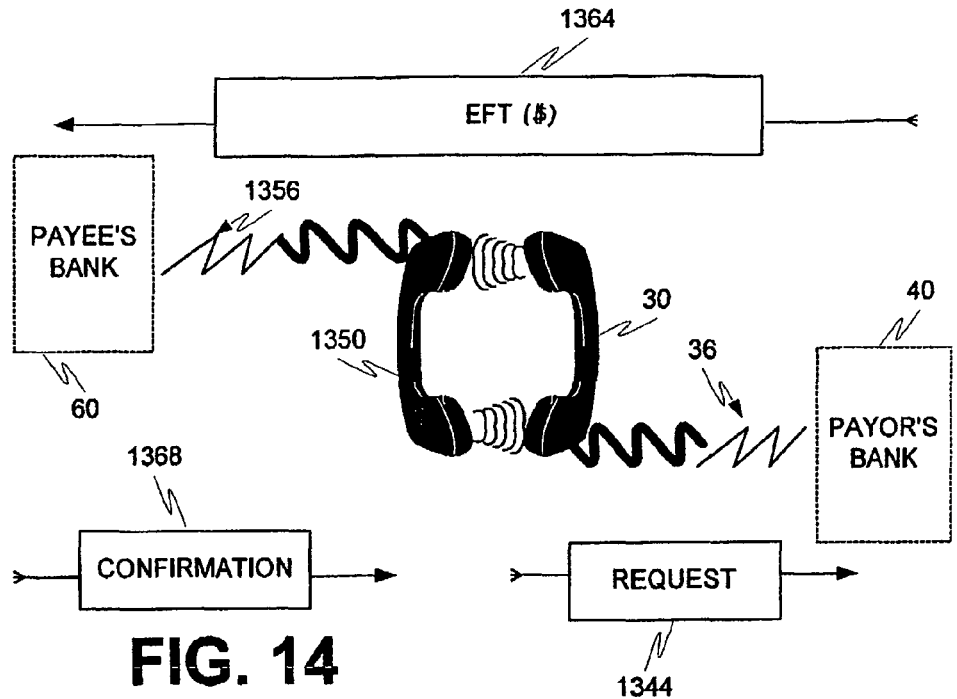
FIG. 14 illustrates the simplest method of the invention for a payor to pay a payee according to the scheme of FIG. 13.

Referring to FIG. 14, two telephones 30, 1350 are shown for a general payment, in one of the simplest embodiments. Absent the intervention of a cash register, at least one must dial the amount to be paid. This is preferably the buyer, who dials in the amount. It should be remembered that, for purposes of the invention, the payee's bank need not be remote, or accessed by telephone. It can be an electronic wallet. In addition, although telephones are shown and mentioned, they can be communicators as described above.

A number of methods are provided for a consumer to make a payment to a vendor according to FIG. 14. The methods include the consumer establishing over a first telephone line a first communication link between a first telephone device and an automated agent of the consumer that may be located remotely to the consumer.

Additionally the methods of FIG. 14 include the vendor establishing over a second telephone line a second communication link between a second telephone device and an automated agent of the vendor that is located remotely to the vendor. The second link may be established concurrently with the first communication link being established, for a real time application.

Then the first telephone device is positioned close to the second telephone device, as shown. This close positioning effectuates coupling.

Then the consumer's agent transmits a payment authorization code to the vendor's agent over the first and second communication links to effectuate the payment. The method includes additional acts, such as entering an amount to be paid (which can be done by the buyer dialing in the amount in his telephone keyboard), the consumer's agent verifying that the transmitted amount is within a spending limit of the consumer, etc.

The invention also provides methods for a device to receive payment, and devices that practice these methods. The devices include but are not limited to vending machines, such as that of FIG. 1, parking meters, cash registers such as those of FIG. 6 and FIG. 10, automated bank tellers, and dual couplers such as those of FIG. 13.

In general, the methods include registering an amount. The amount can be registered by being entered. Entry can be by the buyer making the selection. Alternately, the amount can be registered at the machine level, if the amount is the same for all selections. Such would be true for a soft drink vending machine.

The methods further include transmitting to a coupler of the machine a purchasing code related to the amount. The purchasing code can include the identity of the machine, goods intended for, price, etc. They can include time and date. They can also include an EFT mode code. The codes can be for the machines identification, and the product identification. Transmitting to the coupler is for retransmitting to a buyer's agent.

The methods further include that, when the coupler receives a reply, optionally issuing an acknowledgement of having been paid. The acknowledgement can be by making a sound, displaying something, printing a receipt, releasing goods (e.g. by sending a signal to a mechanism that does that), etc.

Other steps include but are not limited to displaying the entered amount, and displaying a confirmation of being paid. The reply can be analyzed for validity as a payment confirmation code. Analyzing can include decrypting, if the latter came through exclusively through the circuits of the circuits of the buyer. The sent time and date can be used as kernels for encoding.

The purchasing code can include an EFT mode code. If it requests that the seller's bank be contacted, the purchasing code can include contact data for contacting an agent of the seller.

It will be appreciated that the method of FIG. 14 is very well suited to institutional payees, such as utility companies, credit card companies, and any other company that receives many payments from consumers, often on a regular basis. The institutional payee may configure the payee's bank 60 as a deposit only account, and supply to its customers the telephone number to call for paying. A discount can be offered, since the deposit will be instant. This requires the consumer to have access to two telephone lines 36, 1356 simultaneously. Many people have multiple telephone lines today.

Figure 15:
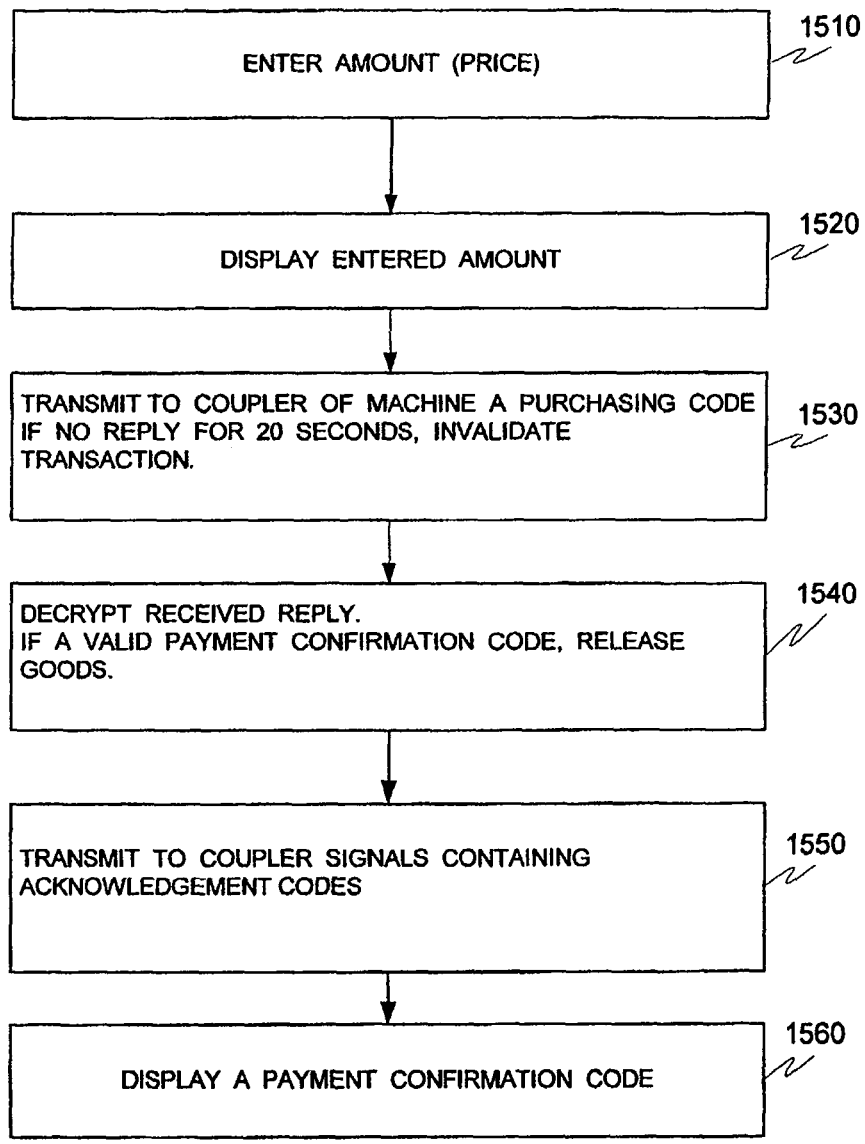
FIG. 15 is a flowchart for illustrating a method according to the invention for a device to get paid according to the scheme of FIG. 5.

An embodiment of a method 1500 is now described with reference to FIG. 15. This includes the boxes 1510, 1520, 1530, 1540, 1550 and 1560. The method 1500 includes performing the steps or acts written in these boxes. In yet another embodiment, the purchasing code can be a mere code number posted on the machine. The buyer is to dial that code number. This way the coupler of the vending machine does not have to issue any sound signals, only receive them.

Figure 16:
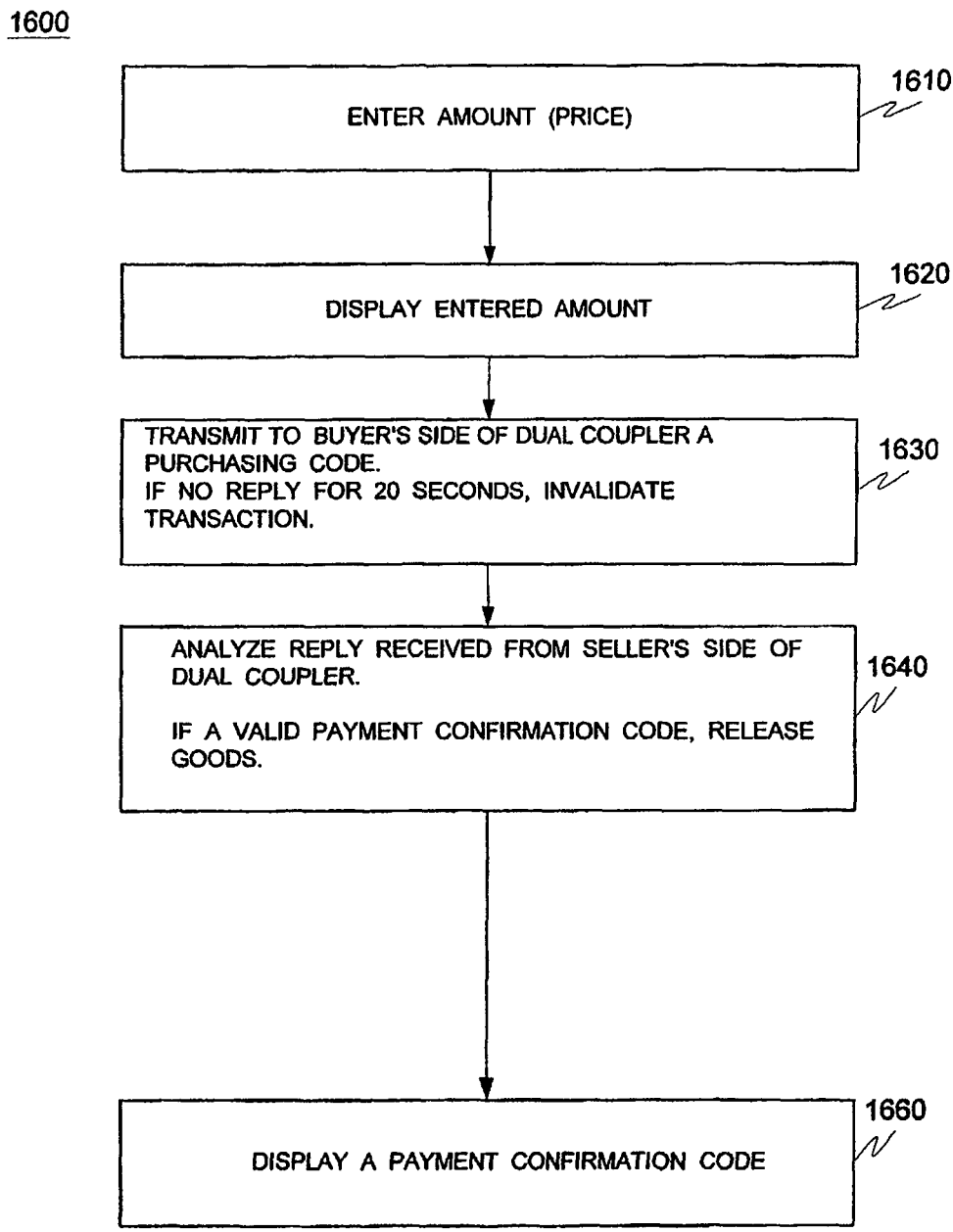
FIG. 16 is a flowchart for illustrating a method according to the invention for a device to get paid according to the scheme of FIG. 13.

Another embodiment of a method 1600 is now described with reference to FIG. 16. This includes the boxes 1610, 1620, 1630, 1640 and 1660. The method 1600 includes performing the steps or acts written in these boxes.

Another embodiment of the method of the invention is where establishing the first communication link is performed by two steps. First call back information is transmitted to the buyer's agent, preferably by a preliminary link. The preliminary link is either by email (from a PDA), or a preliminary telephone line connection, and from where there are transmitted telephone signals that encode the call back information. Then the buyer's agent uses the call back information to establish the first communication link. The latter is preferably performed after the preliminary link is discontinued, such as by hanging up the preliminary telephone line.

Preferably, the buyer's financial institution determines whether the call back information meets at least one validity criterion, and does not establish the first communication link if it does not. The validity criterion can be a password. Alternately, it can be that the origin of the received call back information is one of a set of preapproved origins. This means tracing the origin of the call to establish the preliminary telephone line, and rejecting it if not from a preapproved set of enabled telephone numbers. Tracing is accomplished by receiving information about the telephone number of the caller. This feature is particularly suitable for use with cellular telephones that carry their own individual access number.

Another possible security feature is implemented according to the invention by using an identification code of the communicator 30 itself. Such can be an identification code of a central processing unit (CPU) of the device. Upon initially setting up the account with the financial agent, the buyer causes the communicator 30 to transmit its internal id code. The communicator 30 is preferably built with a separate button or series of inputs that cause it to play out that code. Playing out can be in coded form, not necessarily intelligible to the buyer. (If not intelligible, then it would be harder for others to duplicate.) Once the financial agent receives it, it records it and associates it with the account. This way the account can only be accessed by using the communicator 30, which is better for security. Then as part of establishing the first communication link, the buyer again causes the communicator 30 to transmit its internal id code as part of the authorization process. This transmission can be considered as part of the password that the buyer transmits to its agent for authorization.

Figure 17:
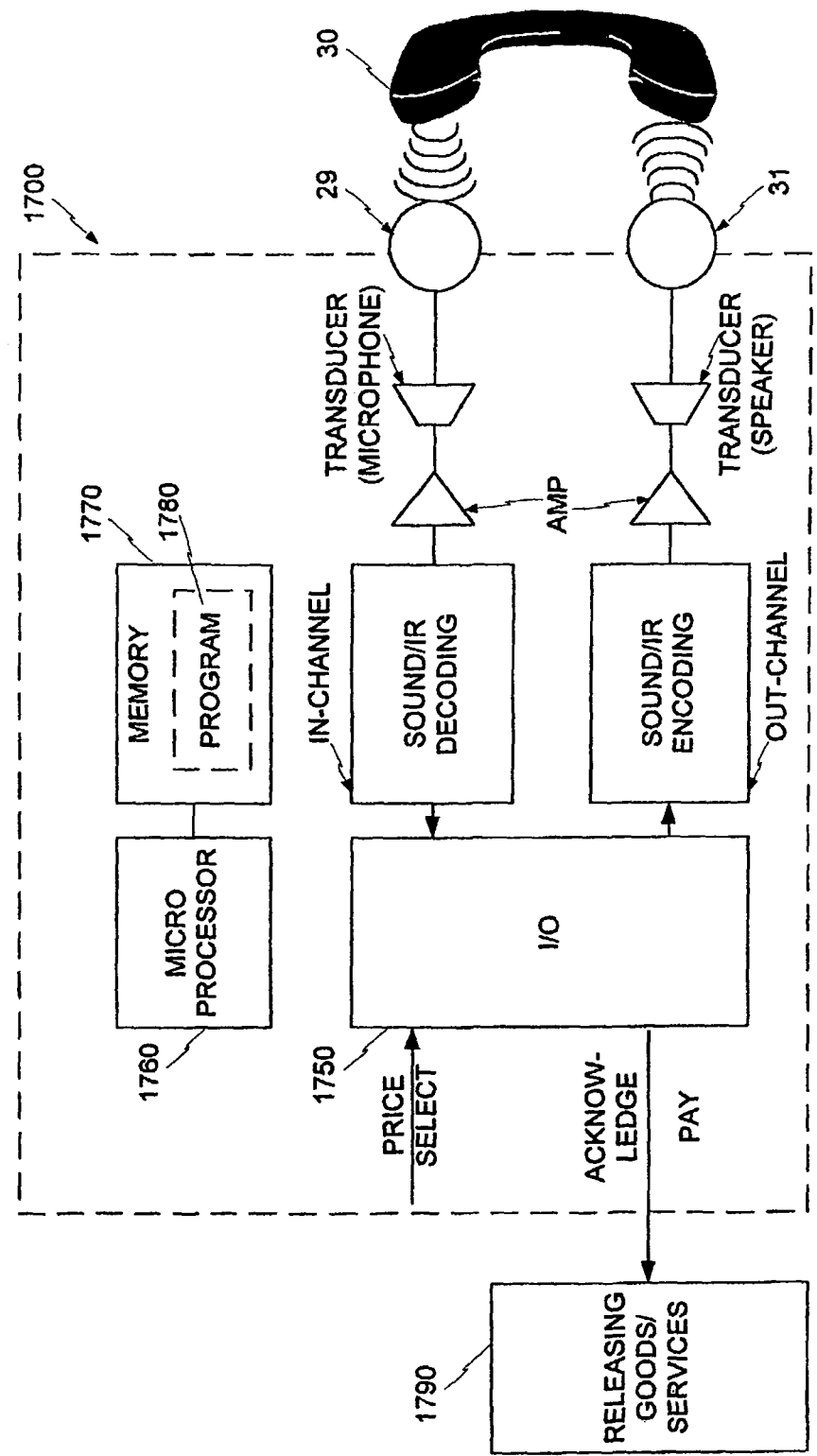
FIG. 17 is a functional block diagram of selected portions of a coupler of the vending machine of FIG. 1, or of the cash register of FIG. 6.

The invention also provides devices to facilitate a consumer using a communication device to pay a vendor. A main device is a coupler 1700, shown in FIG. 17. The coupler 1700 can be used in connection with a vending machine, a cash register, a parking meter, an Automated Teller Machine (ATM), etc.

The coupler 1700 includes the two openings 29, 31, at the beginning and the end respectively of an in-channel and an out-channel. The channels include an encoder and a decoder, amplifiers, and transducers. For the case of sound, the transducers can be a speaker and a microphone. For the case of IR light, the transducers can be a detector and an IR LED. For the case of RF, the transducers can be a detector and a transmitter.

The channels terminate at an I/O unit 1750, coupled with a microprocessor 1760, which in turn is coupled with a memory 1770. A program 1780 resides in the memory 1770.

A vending machine is anything that dispenses something of value, and for which it receives money or equivalent (e.g. charge, etc.), i.e. creates a Point of Sale. There are vending machines for food, gasoline, newspapers, music media, software, parking meters, etc.

Payment is acknowledged by the I/O module 1750 sending a signal to a releasing unit 1790 of the vending machine. For a vending machine of goods, the releasing unit 1790 releases the goods. For an ATM, the releasing unit 1790 releases cash. For a cash register, the releasing unit 1790 simply indicates payment. For a parking meter, the releasing unit 1790 registers paid time.

In some of these instances, the price is selected as described elsewhere. In others, the price is dialed in by the consumer, and goods or services are released commensurately with the money paid.

The code also provides software for the microprocessor, or the program 1780. The detailed descriptions which follow are presented largely in terms of display images, algorithms, and symbolic representations of operations of data bits within a computer memory. These algorithmic descriptions and representations are the means used by those skilled in the data processing arts to most effectively convey the substance of their work to others skilled in the art. Often, for the sake of convenience only, it is preferred to implement and describe a program as various interconnected distinct software modules or features. This is not necessary, however, and there may be cases where various softwares are equivalently aggregated into a single program with unclear boundaries.

An algorithm is here, and generally, conceived to be a self consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. When stored, they can be stored in any computer-readable medium. It proves convenient at times, principally for reasons of common usage, to refer to these signals as bits, values, elements, symbols, characters, images, terms, numbers, or the like. It should be borne in mind, however, that all of these and similar terms are to be associated with the appropriate physical quantities and are merely convenient labels applied to these quantities.

In the present case, the operations are machine operations performed in conjunction with a human operator. Useful machines for performing the operations of the present invention include general purpose digital computers, microprocessors, or other similar devices. In all cases, there should be borne in mind the distinction between the method operations of operating a computer and the method of computation itself. The present invention relates to method steps for operating a computer and processing electrical or other physical signals to generate other desired physical signals.

The present invention also relates to apparatus for performing these operations. This apparatus may be specially constructed for the required purposes or it may comprise a general purpose computer selectively activated or reconfigured by a computer program stored in the computer. The algorithms presented herein are not inherently related to any particular computer or other apparatus. In particular, various general purpose machines may be used with programs in accordance with the teachings herein, or it may prove more convenient to construct more specialized apparatus to perform the required method steps. The required structure for a variety of these machines will appear from the description given below.

It should be clear to a person skilled in the art that the program of the invention need not reside in a single memory, or even a single machine. Various portions, modules or features of it can reside in separate memories, of even separate machines. The separate machines may be connected directly, or through a network, such as a local access network (LAN), or a global network, such as what is presently known as Internet-1. Similarly, the users need not be collocated with each other, but each only with a machine that houses a portion of the program.

In general the program 1780 is for releasing goods in a vending machine. The program comprises a payment confirmation input, and software for analyzing the payment confirmation input for agreement with preset criteria. Those are as described above. In addition, the program comprises outputting software for outputting an enabling code.

The program comprises optional features. The software can further generate the purchasing code, and encrypt is as described above. It can extract an amount received from the payment confirmation code, and include the amount in the enabling code. Alternately, it can receive a price input from the machine, and analyze the payment confirmation input for agreement with the price input. The price input then becomes the preset criteria.

Figure 18:
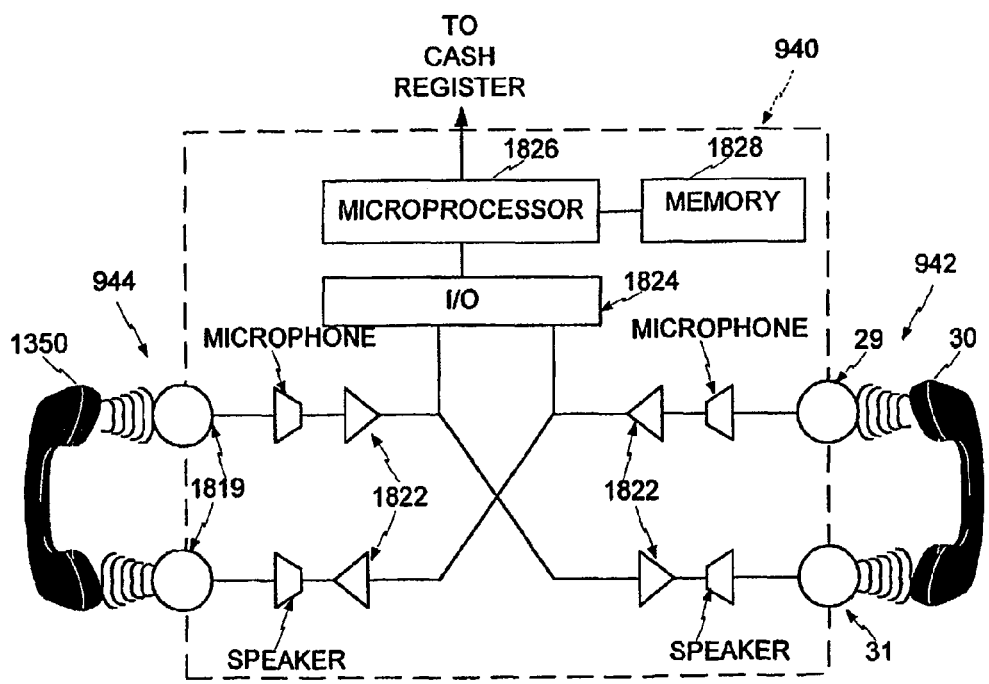
FIG. 18 is a functional block diagram of selected portions of the dual telephone coupler of FIG. 10.

Referring to FIG. 18 the dual telephone coupler of FIG. 10 is now described. In general, it is a coupler for assisting in the communication between a first communicator 30 and a second communicator 1350. Even though they can be composite communicators, each of the communicators in FIG. 18 has a speaker and a microphone.

More particularly, the coupler 940 is placed between the telephones of FIG. 14, to assist their communication. While there are similarities with components of the device of FIG. 17, it is to be noted that coding and decoding need not be in the path of the two communicators. Coding and decoding are only useful for the dual coupler, which is "eavesdropping" in the exchange between the telephones.

The dual telephone coupler 940 is also known as a connector for two communicators. It includes a docking station 942 at the buyer's side, and a second docking station 944 at the seller's side. The docking station 944 includes receptacles 1819 for the second telephone 1350. The dual telephone coupler 940 also includes two channels for permitting the two docking stations 942, 944 to exchange signals that encode sounds. Amplifiers 1822 are preferably placed in each channel to amplify the signals, that are really sounds between the telephones 30 and 1350. In addition, an I/O unit 1824 eavesdrops for a coupled microprocessor 1826 with memory 1828, and interprets the electrical signals. When the right payment confirmation code is perceived or intercepted, the microprocessor generates an I/O signal for the associated cash register.

Methods are now described for bank of other financial institutions to enable their customers or subscribers to perform the methods of the invention. These are methods for a bank to process consumer electronic fund transfer (EFT) requests.

A general method comprises receiving a telephone call from a caller over a first telephone communication link of connected network. When a call is received, the caller is associated with an account. This is accomplished by the caller dialing his secret code. This is different from the prior art of wiring money, where the caller, if any is a bank employee conducting wire transfers on behalf of one of its clients. Here it is the client himself calling the paying bank, and at the consumer level. Associating can be by the caller transmitting a personal identification code over the first telephone communication link. The personal identification code then can be associated with the customer's account.

According to one embodiment, the first bank (i.e. the paying bank) then receives over the first telephone communication link identification data for contacting a second bank. This is typically and preferably a telephone number. Then the first bank uses the identification data (e.g. the telephone number) for contacting the second bank over a second communication link.

The first bank then receives over the first telephone communication link a seller's code identifying a seller's account with the agent, and retransmits the seller's code through the second communication link.

The first bank then receives over the first telephone communication link data corresponding to an amount of the payment. Then it transmits a payment code corresponding to the amount through the second communication link and debits the account in accordance with the amount.

It should be noted that the two above need not be separate codes. With a proper protocol, they can be integrated into a single code. Other information can also be integrated into the single code, which can be transmitted repeatedly. If encryption is used, however, it is highly recommended that externally verifiable information known to the payor not be included in the code, as it can be used as a basis for deciphering the transmissions.

Then the first bank receives from the second bank over the second communication link a payment confirmation code, and retransmits it through the first telephone communication link. Upon receiving it, the machine can release its goods or services.

The payment confirmation code should be encrypted. Indeed, the vendor does not know what telephone number the consumer has dialed. Vendor's concern is that the set of received codes can be manufactured, and one transmitted artificially, thus giving the vendor the false impression that he has been paid for services or goods for which he has not been paid. This risk can be mitigated by encrypting from the vendor's bank through the consumer's telephone, and decrypting within the vendor's device. In addition, it can be combined with dates, times, squared and then truncated, etc.

Encryption can be by using a preset series of ciphers (in encryption science this is known as a one time "notepad"). But the entries of the "notepad" can be rotating, to allow for indefinite use. The ciphers are programmed in common with the vendor's device and the vendor's bank account number. The ciphers can be used by themselves, or be fed into a larger algorithm as kernels for generating larger ciphers, such as with random number generators.

According to another embodiment, the first bank (i.e. the paying bank) then receives over the first telephone communication link data corresponding to an amount of the payment. Then it transmits a payment code corresponding to the amount through the first communication link, and debits the account in accordance with the amount.

The method can include some of the above described features.

Both methods can include other features, such as transmitting over the first telephone communication link signals to generate a voice instruction for a telephone to be coupled with a coupler. This need not be an explicit instruction; the user of the telephone can place the telephone on the coupler as soon as he hears computer type tones.

In addition, the bank can generate a fee per transaction. The fee need be very small. An entry can be generated for customer's periodic statement. Other features can include confirming that the requested amount comports with a limit of the account prior to transmitting the payment code. The limit can be an available balance, an overdraft limit, or a credit limit, a per charge limit, etc.

Figure 20A:
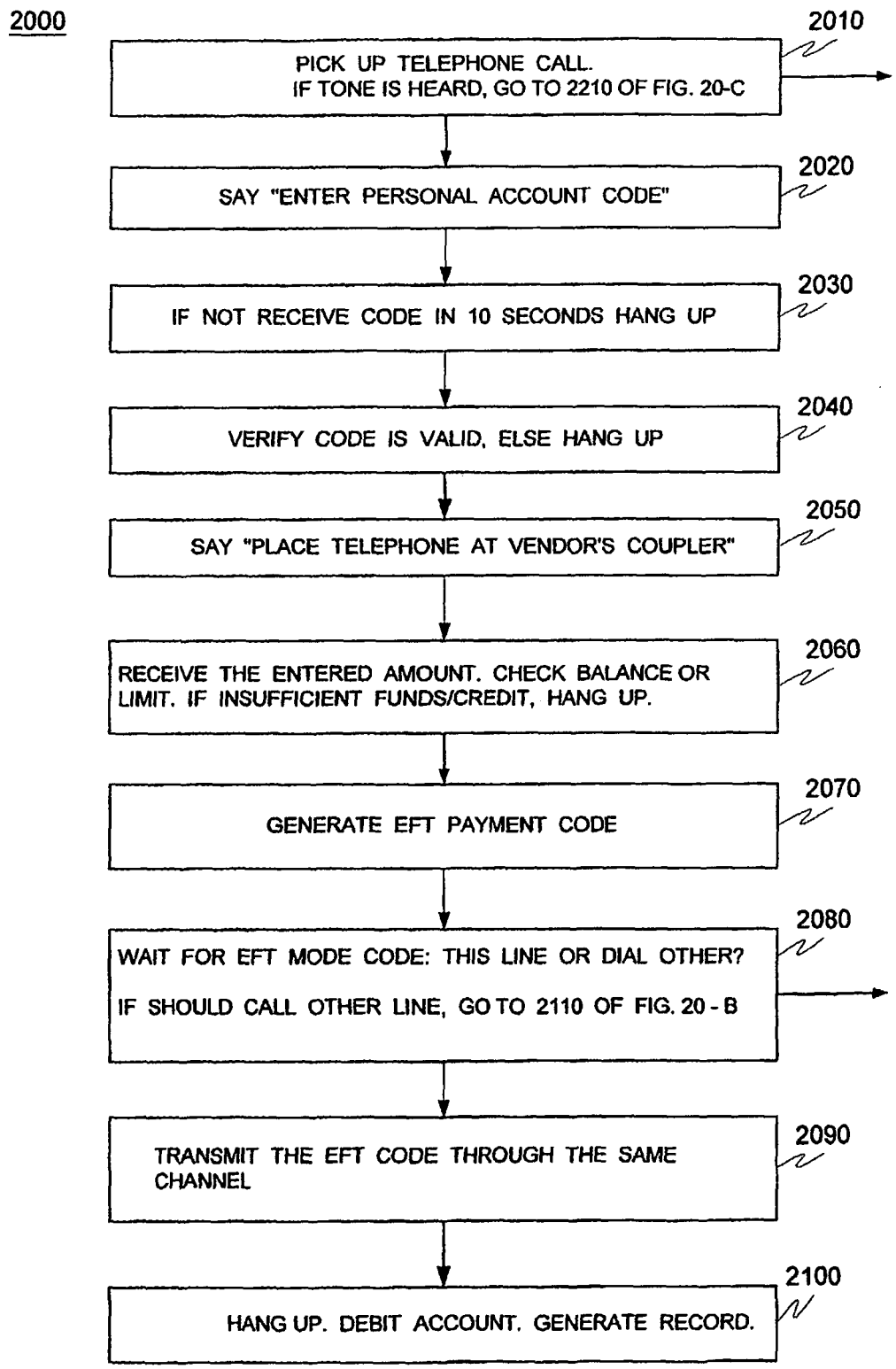
FIGS. 20-A, 20-B and 20-C together are a flowchart for illustrating a method of operation for a financial institution to allow its customers to wire or receive money or credit according to the invention.
Figure 20B:
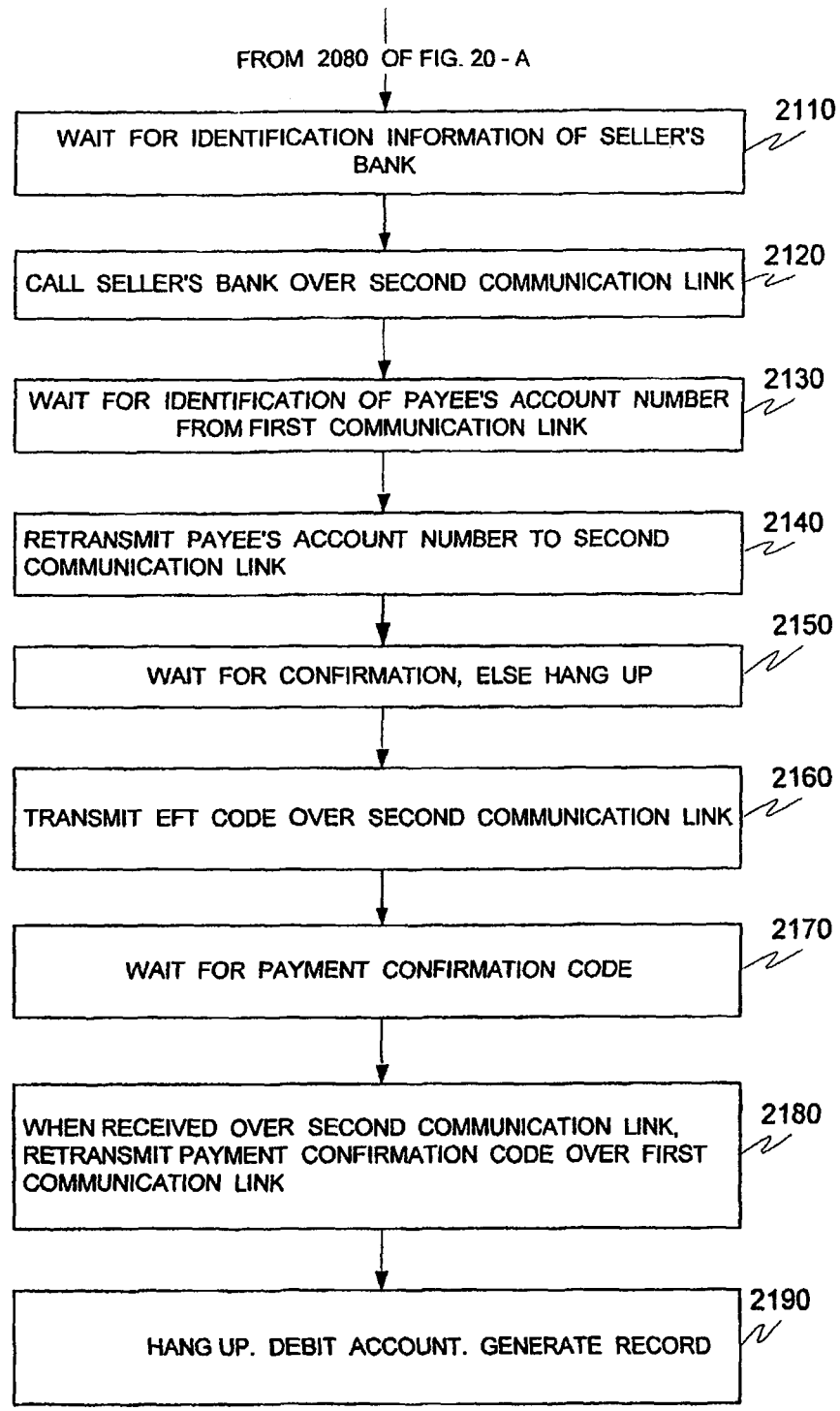
Figure 20C:
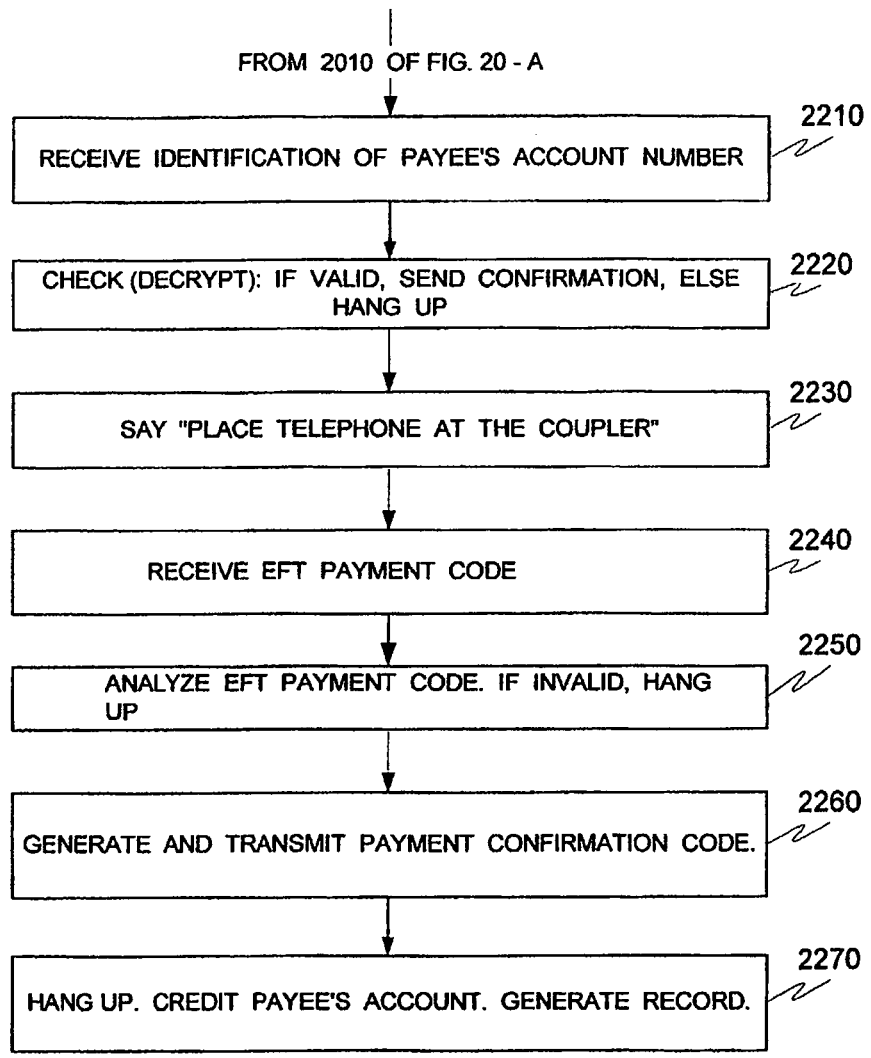

Referring to FIG. 20-A, FIG. 20-B and FIG. 20-C, a method according to the invention is described for a bank. The method is described by a flowchart 2000 that is formed when the three are placed next to each other. Many other methods are enabled in view of the present description, to enable either a scheme of FIG. 5 or that of FIG. 13:

According to box 2010, the telephone is picked up by the bank. If a tone is heard, the bank can act as a payee, and execution transfers to FIG. 20-C. That is because the seller's bank is preferably called directly by a machine, either the buyer's bank (FIG. 5) or the seller's coupler (FIG. 13, adapted so that the coupler includes a module for directly dialing).

If a tone is not heard, the bank will act as a buyer's bank. Execution proceeds to boxes 2020, 2030, 2040, 2050, 2060. If, at any one stage where an expected input is not received, hanging up is only an option. Alternately, messages could be repeated, to assist an inexperienced buyer.

Then, at box 2070, an EFT payment code is generated. This can be designed in any suitable way, to be a payment or an authorization to charge credit. Preferably it includes amount of payment, and date and time it was generated. It may include data received from the seller's machine, such as machine location, kind of goods or services purchased, etc.

Then, at box 2080, an input is received that determines whether the action will be according to FIG. 5 or FIG. 13. The input is also called an EFT mode code, and can be given in a different order with relation to the other boxes.

If the linking scheme will be according to FIG. 13, then (box 2090), the generated EFT code is transmitted through the same channel (i.e., through the first telephone communication link). Then on to box 2100.

If the linking scheme will be according to FIG. 5, then execution proceeds to FIG. 20-B, and from there to boxes 2110, 2120, 2130, 2140, 2150, 2160, 2170, 2180, 2190. The method includes performing the steps or acts written in these boxes.

If the bank operates as a seller's bank, execution has transferred FIG. 20-C. The bank will analyze the EFT payment code for validity, but it need not check a limit (will take any amount given). It will compose a payment confirmation code for the seller, and generally encrypt it as described elsewhere. If encrypted, data corresponding to the amount can follow unencrypted. This can be accomplished with boxes 2210, 2220, 2230, 2240, 2250, 2260, 2270. The method includes performing the steps or acts written in these boxes.

Figure 19:
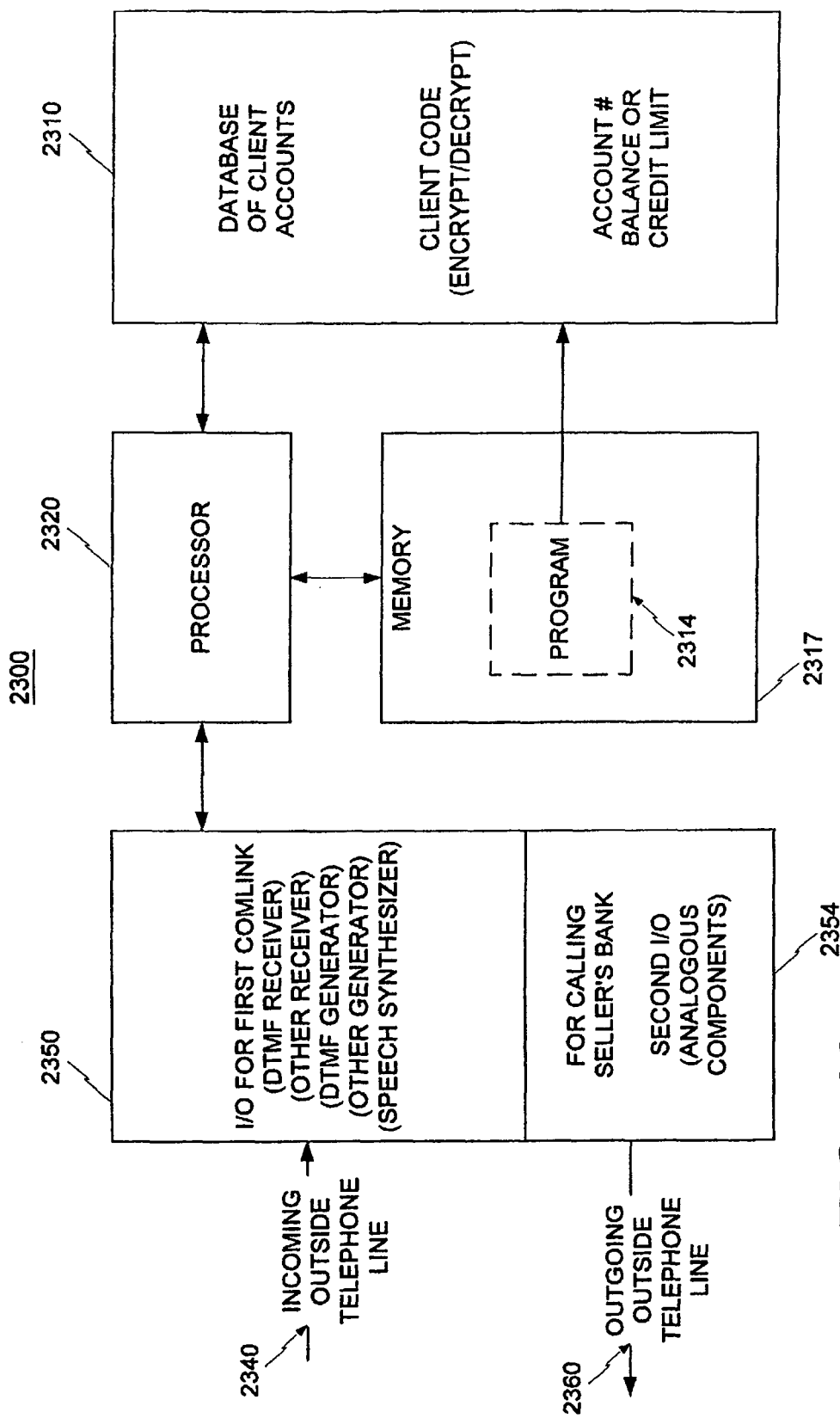
FIG. 19 is a block diagram of a computer of a financial institution interfacing with a customer account database according to the invention.

Referring to FIG. 19, a system 2300 for a financial institution according to the present invention is now described that performs the methods of the invention. The system 2300 works for a bank or financial institution to work as a buyer's bank 40 or seller's bank 60 or 1360, for either one of FIG. 5 and FIG. 13.

The system includes a database 2310 of customer accounts, and a program 2314 residing on a memory 2317. At least one processor 2320, such as a microprocessor, is coupled with memory 2317, and can be operationally supported by other structure (not shown). One processor 2320 is provided for each incoming outside telephone line 2340. Security protocols ensure that an account is accessed only from one microprocessor.

An Input/Output unit 2350 is provided between the line 2340 and the microprocessor 2320. Each I/O unit 2350 converts telephone signals to microprocessor signals. This may necessitate including a DTMF receiver and a DTMF generator as described above. In addition, a speech synthesizer is recommended, for giving occasional verbal instructions to the caller.

If the method of FIG. 5 is followed, then a second I/O unit 2354 is provided. This is for when the system 2300 is being requested to operate as a buyer's bank, and also being requested to call a seller's bank on an outside telephone line 2360.

It will be readily apparent that there can be other systems for implementing the above structure. In the above, FIG. 19 deliberately mixes hard objects (devices) and data structures (software), for better illustrating the interplay and cooperation of the components.

The invention also provides a program for a computer of a bank. The program is most advantageously implemented as a computer program 2314. The program of the invention is made to perform the methods of the invention.

A person skilled in the art will be able to practice the present invention in view of the present description, where numerous details have been set forth in order to provide a more thorough understanding of the invention. In other instances, well-known features have not been described in detail in order not to obscure unnecessarily the invention.

While the invention has been disclosed in its preferred form, the specific embodiments thereof as disclosed and illustrated herein are not to be considered in a limiting sense. Indeed, it should be readily apparent to those skilled in the art in view of the present description that the invention can be modified in numerous ways. The inventor regards the subject matter of the invention to include all combinations and subcombinations of the various elements, features, functions and/or properties disclosed herein.

The following claims define certain combinations and sub-combinations, which are regarded as novel and non-obvious. Additional claims for other combinations and subcombinations of features, functions, elements and/or properties may be presented in this or a related document.

The invention claimed is:

1. A coupler comprising:
    a docking bay configured to receive a communications device, wherein the communications device has an established communication link to a particular financial institution;
    a module configured to receive electronic data corresponding to a price from a point of sale device;
    encoder circuitry coupled to the module, wherein the encoder is configured to receive the electronic data and to provide at least one first signal corresponding to the price to the communications device for transmission to the particular financial institution;
    decoder circuitry coupled to the docking bay and to the module, wherein the decoder is configured to receive at least one second signal from the communications device corresponding to a payment confirmation of the price received by the communications device from the particular financial institution; and
    wherein the module is further configured to receive at least one decoded second signal corresponding to the payment confirmation and to provide at least one third signal corresponding to the payment confirmation to the point of sale device.

2. The coupler of claim 1, wherein the encoder is further configured to provide at least one additional signal, wherein the at least one additional signal corresponds to an identification of a further financial institution for deposit of funds.

3. The coupler of claim 2, wherein the at least one additional signal further corresponds to an identification of a bank account at the further financial institution for the deposit of funds.

4. The coupler of claim 1, wherein the payment confirmation corresponds to a payment sent to a further financial institution from the particular financial institution.

5. The coupler of claim 1, wherein the at least one first signal and the at least one second signal comprise an audio signal, and wherein the coupler further comprises:
    a microphone coupled to the docking bay and to the decoder, wherein the microphone is configured to receive the at least one second signal and to provide at least one electronic signal to the decoder in response to receiving the at least one second signal; and
    a speaker coupled to the docking bay and to the encoder, wherein the speaker is configured to generate at least one audio signal corresponding to the at least one first signal and to provide the at least one audio signal to the communications device.

6. The coupler of claim 1, wherein the at least one first signal and the at least one second signal comprise at least one infrared signal, the decoder is further configured to decode infrared signals, and the encoder is further configured to encode infrared signals.

7. The coupler of claim 1, wherein the point of sale device is configured to release goods in response to receiving the at least one third signal.

* * * * *

UNITED STATES PATENT AND TRADEMARK OFFICE
CERTIFICATE OF CORRECTION

| | | |
|---|---|---|
| PATENT NO. | : 8,452,701 B2 | Page 1 of 1 |
| APPLICATION NO. | : 12/753728 | |
| DATED | : May 28, 2013 | |
| INVENTOR(S) | : Kavounas | |

It is certified that error appears in the above-identified patent and that said Letters Patent is hereby corrected as shown below:

In the Drawings:

In Fig. 14, Sheet 11 of 18, for Tag "40", in Lines 1-2, delete "PAYOR'S BANK" and insert -- BUYER'S BANK --, therefor.

In the Specification:

In Column 7, Line 47, delete "vending machine 26." and insert -- vending machine 24. --, therefor.

In Column 8, Line 47, delete "vending machine 26," and insert -- vending machine 24, --, therefor.

Signed and Sealed this
First Day of April, 2014

Michelle K. Lee
*Deputy Director of the United States Patent and Trademark Office*